May 15, 1951  J. CHRISTIAN  2,552,620
SIZING AND PACKING MECHANISM
Filed April 22, 1946  14 Sheets-Sheet 3

Inventor
Jack Christian
By N. D. Parker Jr.
Attorney

May 15, 1951 J. CHRISTIAN 2,552,620
SIZING AND PACKING MECHANISM
Filed April 22, 1946 14 Sheets-Sheet 6

Inventor
Jack Christian.
By N. D. Parker Jr.
Attorney

May 15, 1951  J. CHRISTIAN  2,552,620
SIZING AND PACKING MECHANISM
Filed April 22, 1946  14 Sheets-Sheet 7
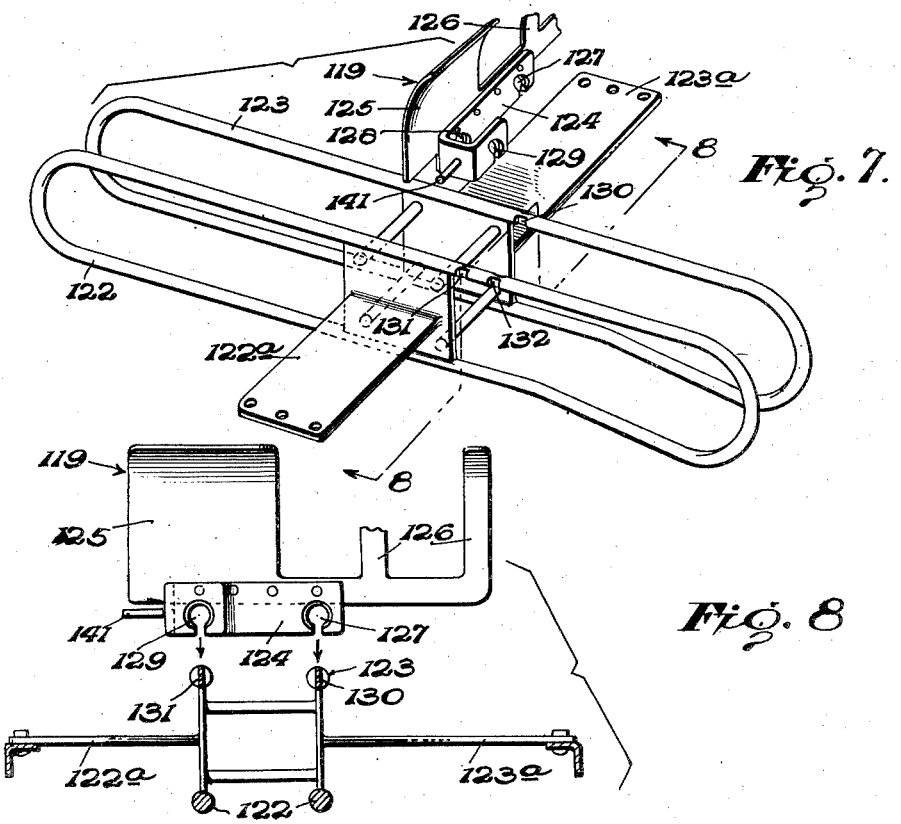
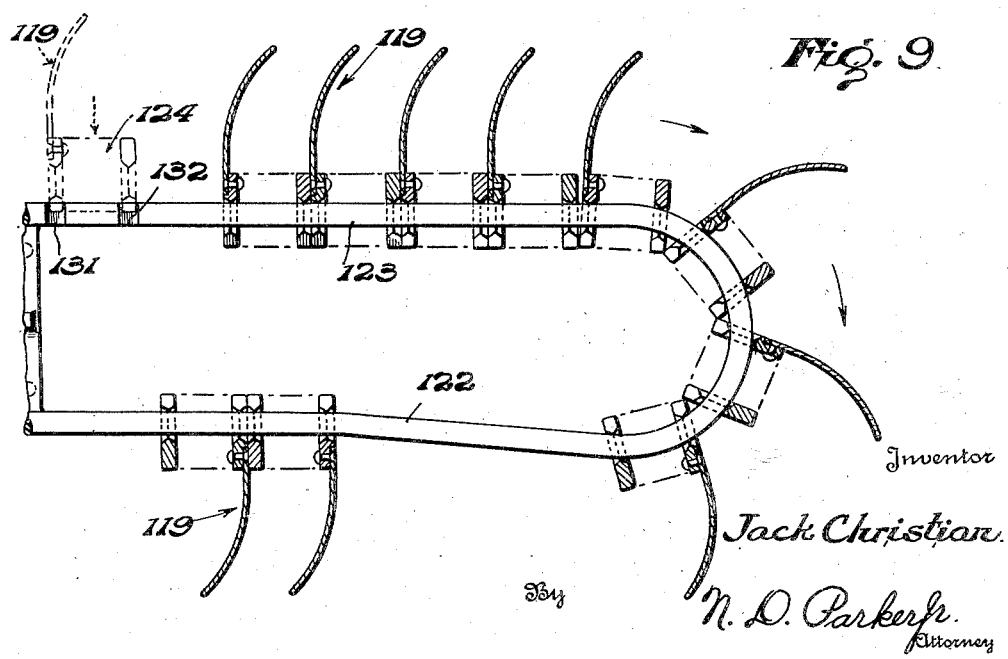
Inventor
Jack Christian
By
N. D. Parker Jr.
Attorney May 15, 1951  J. CHRISTIAN  2,552,620
SIZING AND PACKING MECHANISM
Filed April 22, 1946  14 Sheets-Sheet 8
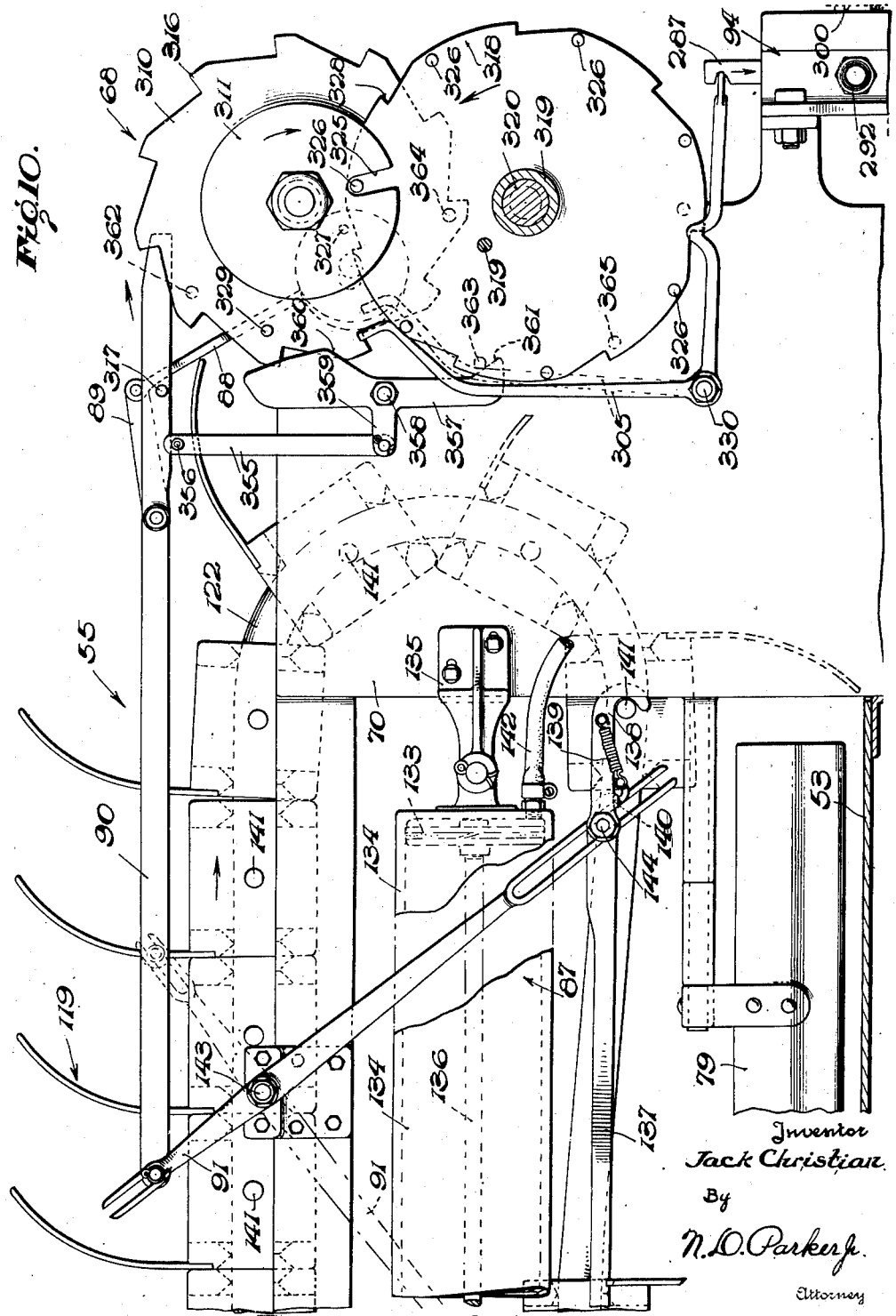

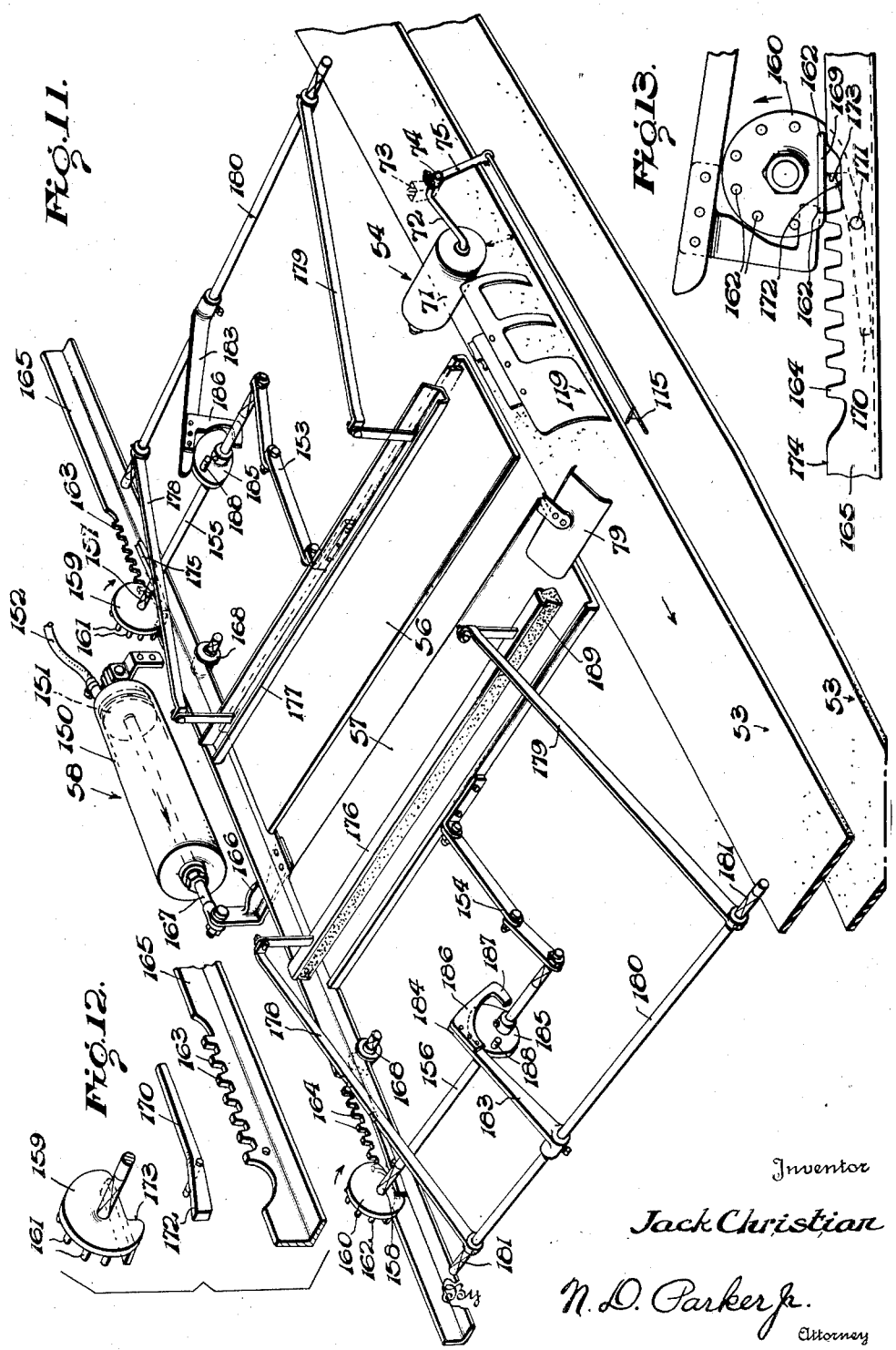

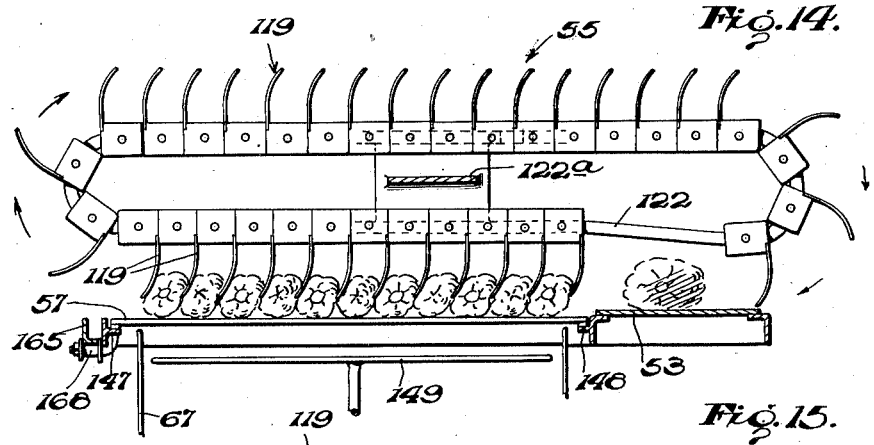
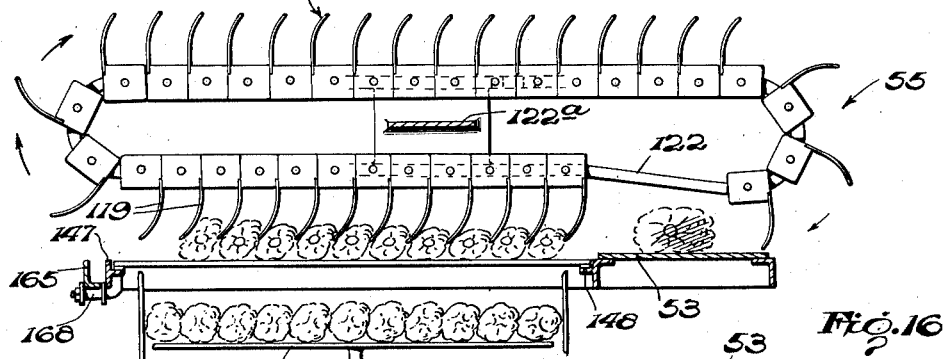
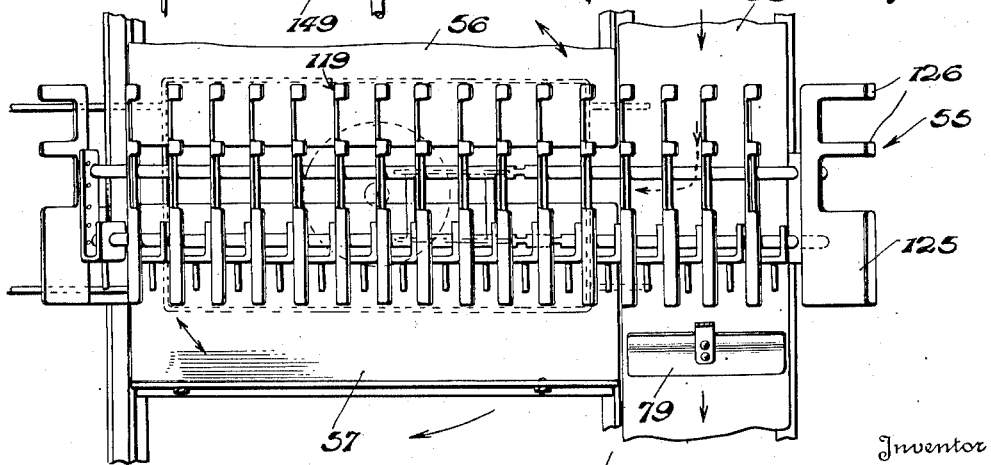

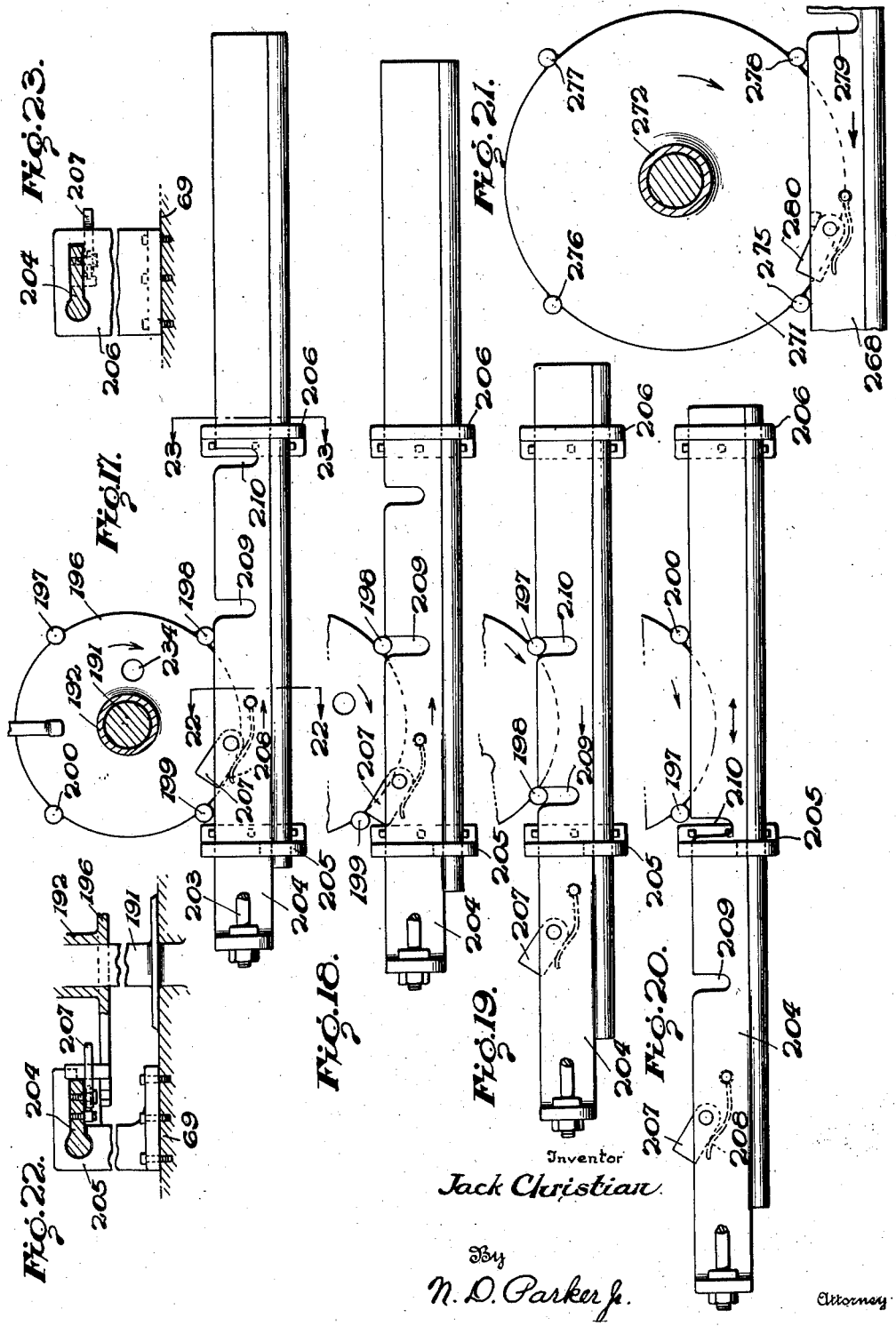

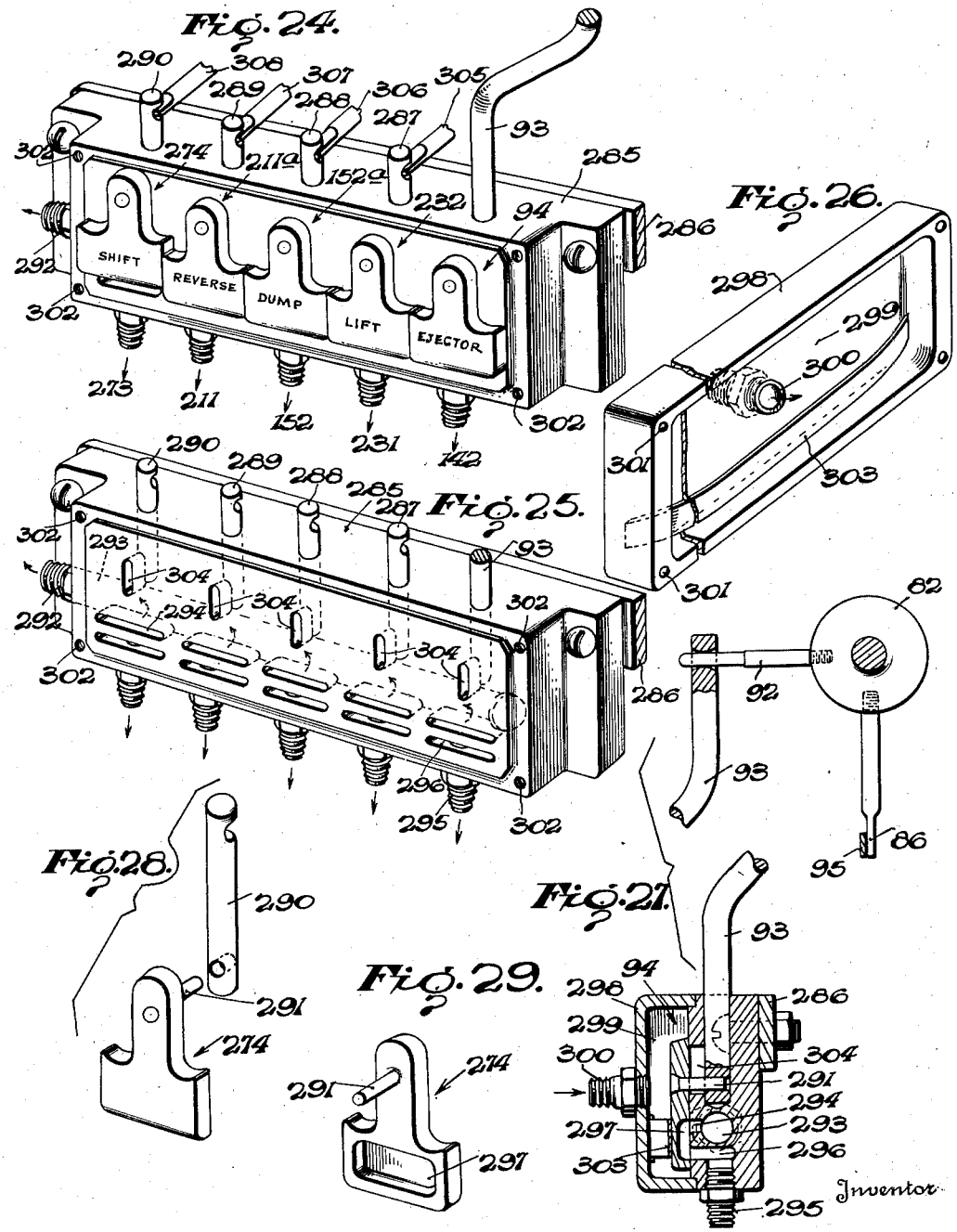

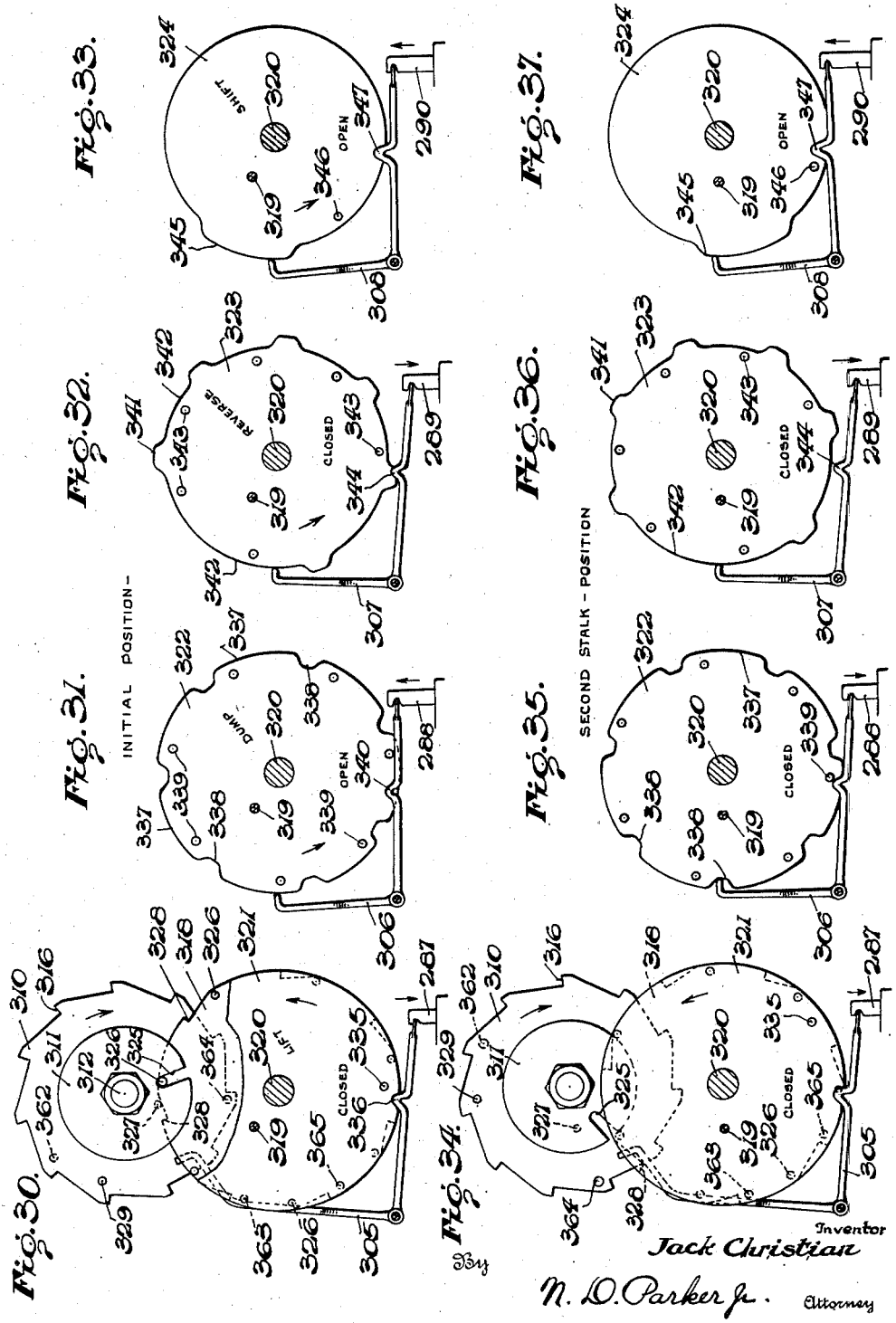

May 15, 1951        J. CHRISTIAN        2,552,620
SIZING AND PACKING MECHANISM
Filed April 22, 1946        14 Sheets—Sheet 14
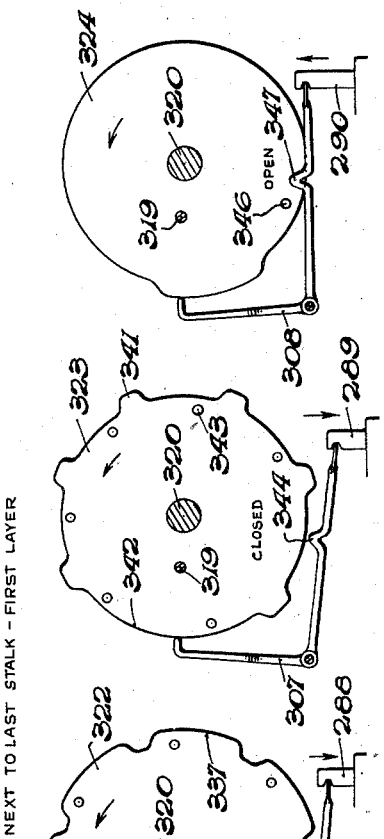
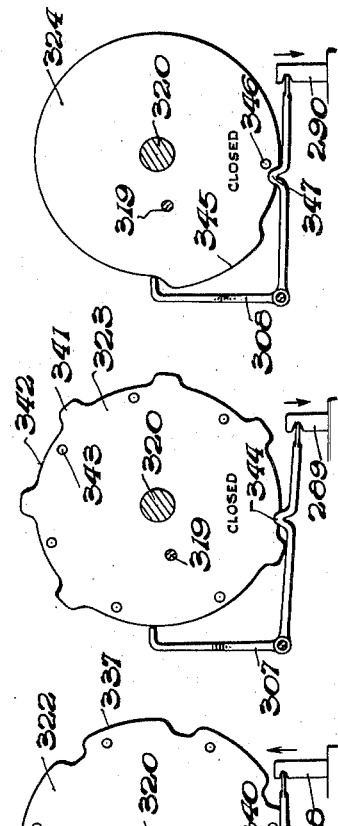
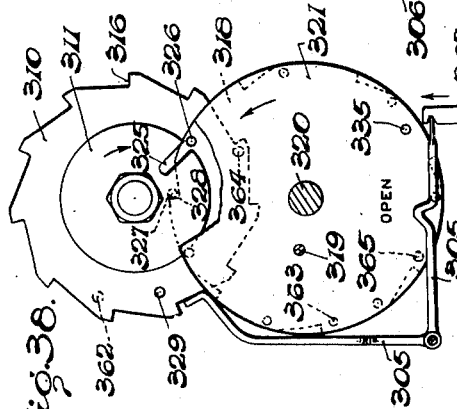
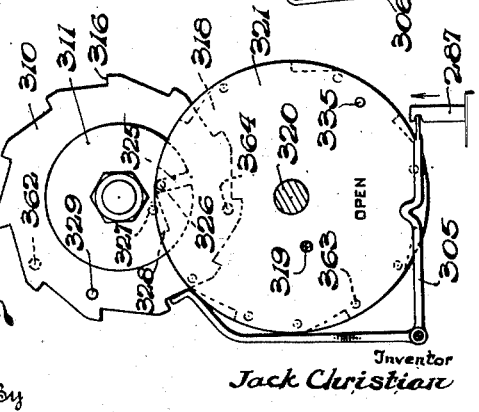
Inventor
Jack Christian
By
N. D. Parker Jr. Attorney Patented May 15, 1951

2,552,620

UNITED STATES PATENT OFFICE 2,552,620

SIZING AND PACKING MECHANISM

Jack Christian, Oviedo, Fla.

Application April 22, 1946, Serial No. 663,942

29 Claims. (Cl. 226—14)

This invention relates to a mechanism for automatically sizing and packing articles and more particularly to an apparatus for automatically selecting articles of substantially the same size from a supply of articles of various sizes, such as celery stalks or other vegetables and for packing such selected articles into a container.

One of the objects of the present invention resides in the provision of a mechanism so constituted as to automatically grade or size celery stalks or other vegetables in such a manner as to enable automatic packing into crates or forms of all units of the same size irrespective of the fact that units of variable sizes are fed to the mechanism.

Another object is to provide automatic sizing and packing apparatus comprising a plurality of mechanisms arranged in cooperation with a conveyor to which is fed a succession of celery stalks or other units of variable sizes, each mechanism being so arranged as to automatically select and pack celery stalks or units of a particular size.

A further object comprehends an arrangement of the above character which is constituted as to perform the automatic sizing and packing operations without attention on the part of the operator and without injury to the celery stalks or other units.

Still another object is to provide a novel construction of the foregoing character which is operated by power to the end that the various movements of sizing and packing the units will be positive in character.

A still further object resides in the provision of a novel timing or governing mechanism for an apparatus of the above type, so constructed and arranged as to automatically control the various steps in the operation of the apparatus.

A still further object resides in the construction of the aforementioned timing mechanism in such a manner that the same may be readily adjusted in order to vary the timing of various of the parts of the mechanism in order to secure desired variations in the assembly of celery stalks, thus enabling different machines to be readily adjusted to pack the same size crates with variable numbers of celery stalks of different diameters.

A further object resides in the novel constructions and associations of parts for the purpose of rendering the same capable of economical manufacture, ease of operation and adjustment, and ready repair or replacement of parts.

Other objects and novel features of the invention will appear more fully hereinafter from the following detailed description of the invention when taken in connection with the accompanying drawings. It is to be expressly understood, however, that the drawings are employed for purposes of illustration only and are not designed as a definition of the limits of the invention, reference being had for this purpose to the appended claims.

In the drawings, wherein similar reference characters refer to similar parts throughout the several views:

Fig. 7 is a perspective view of the frame of the assembly mechanism and illustrates the manner of connection of one of the assembly elements thereon;

Fig. 8 is a sectional view taken along lines 8—8 of Fig. 7;

Fig. 9 is a partial sectional view illustrating the method of incorporation of the assembly elements on the frame of Fig. 7;

Fig. 10 is a partial side view of a portion of the ejecting mechanism and illustrates also certain parts of the timing mechanism;

Fig. 11 is a partial perspective view of the assembling mechanism and illustrates the construction for automatically dumping the layers of celery stalks which are assembled to one side of the conveyor;

Figs. 12 and 13 are partial perspective views of details of the construction of Fig. 11;

Figs. 14 and 15 are diagrammatic side views of the assembling mechanism illustrating the steps of assembling and dumping the first two layers of celery stalks;

Fig. 16 is a top view of the assembling mechanism;

Figs. 17, 18, 19 and 20 are partial plan views showing various steps in the operation of the crate reversing apparatus;

Fig. 21 is a partial plan view of certain of the mechanism for shifting the filled crate to unloading position and shifting an empty crate into association with the packing mechanism;

Figs. 22 and 23 are transverse sectional views taken respectively along lines 22—22 and 23—23 of Fig. 17;

Fig. 24 is a perspective view of the controlling valve mechanism with the cover plate removed;

Fig. 25 is a view similar to Fig. 24 except that the valves have been removed;

Fig. 26 is a perspective view of the valve housing cover plate;

Fig. 27 is an axial sectional view of one of the valves of Fig. 24;

Figs. 28 and 29 are perspective views of one of the valve elements of Fig. 24;

Figs. 30 to 45 inclusive are diagrammatic illustrations of various positions of the timing mechanism in order to illustrate the control of the various operations of the sizing and packing apparatus, and Fig. 46 is a partial perspective view of the mechanism for lifting a crate or form off of the crate supporting arms and illustrating the celery stalk receiving arms in raised position.

In its broader aspect, the present invention comprehends a mechanism for automatically selecting units of the same size from a group of units of different sizes and for automatically packing a predetermined number of the selected units in a crate or receptacle. A bank of these machines is associated with a traveling supply of the variable sized units in such a manner that successively smaller units are selected and packed by the machines proceeding from the first machine to the last.

In its more specific aspect, the invention is particularly adapted for the sizing and grading of celery stalks or other vegetable units of elongated form and of different sizes or diameters. In using machines constructed in accordance with the present invention, a number of machines are associated with a traveling conveyor on which the celery stalks of various sizes and in washed condition are passed in longitudinally spaced relationship. The largest size of stalk is automatically sized and packed by the first machine, the next largest size by the second machine, and so on down the bank of machines, and the construction is such that, while all of the crates packed by the various machines may be of the same exterior dimensions, the machines will automatically pack the proper number of celery stalks of similar size in each crate to secure a filled crate. Of particular importance, as will appear more fully hereinafter, is the construction whereby the celery stalks are arranged in layers of various numbers and with different numbers of stalks in different layers, the resultant arrangement precisely simulating the packs heretofore made by hand.

Figure 1:
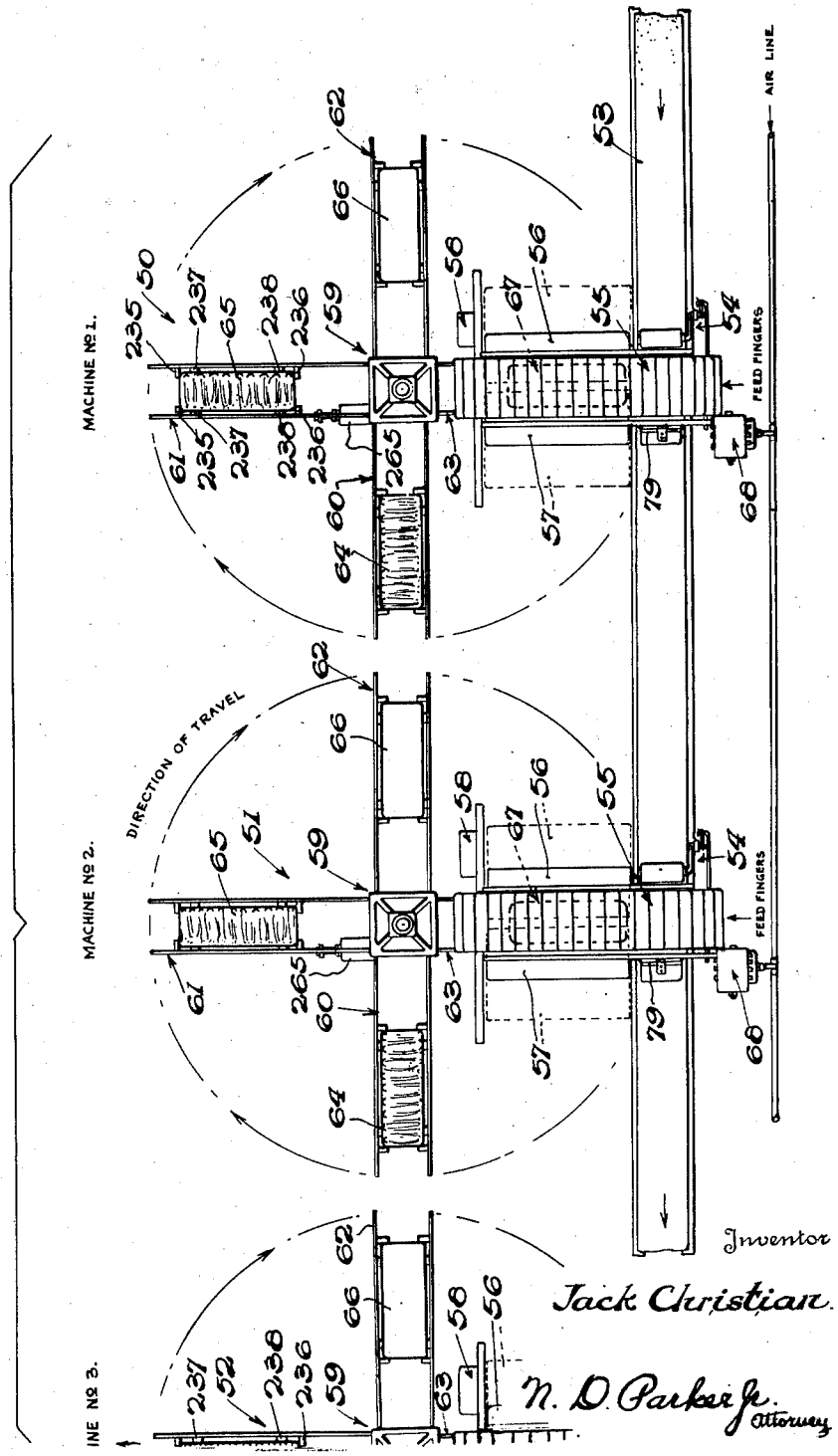
Fig. 1 is a diagrammatic plan view of a plurality of automatic sizing and packing machines constructed in accordance with the principles of the present invention and shown in association with a conveyor along which the celery stalks or other articles to be sized and packed are conducted.

Referring more particularly to Fig. 1, a plurality of machines 50, 51 and 52, forming, for example, the first three machines of a bank of any suitable number, are shown as being associated with a conveyor 53 of the endless belt type and along which the celery stalks are conveyed in spaced longitudinal alignment. Machine 50 is adjusted to size and pack the largest of the celery stalks, 51 the next largest, and so on. All of the machines are similar in construction, the only difference being that of the size of certain of the parts and the adjustment of the various elements in order to size and pack celery stalks of a desired diameter. Hence, in the ensuing description, a single machine will be described in detail and reference will be had to certain of the parts which may be adjusted in order to effect sizing and packing of stalks of different diameters.

The machines of Fig. 1 comprise essentially a sizing mechanism 54 adapted to be contacted and moved by a celery stalk of the desired diameter. Actuation of the sizing mechanism causes operation of an ejecting and assembling device 55 which ejects the sized stalk to one side of the conveyor. As successive stalks are ejected and assembled to one side of the conveyor, they rest upon a pair of dump plates 56 and 57, and, when the desired number of stalks are assembled on these plates for the first layer of celery, a power operated dumping device 58 is operated to move the plates 56 and 57 apart in order to dump the assembled layer of celery stalks into a crate 67 positioned beneath the machine, as illustrated. These dump plates are automatically moved to closed position and, at a suitable time during assembly of the second layer of celery stalks, the crate is automatically rotated through 180°. This operation reverses the position of the layer of celery in the crate with respect to the second layer being assembled so that, when the second layer is dumped, the butt ends of the stalks of the second layer will overlie the leafy ends of the stalks of the first layer. As successive layers of stalks are dumped, this crate reversing operation takes place up to the time when the last layer is dumped.

For purposes of illustration, the present invention will be described in connection with a machine so adjusted as to pack a crate containing six dozen, or seventy-two, stalks, known as Number 6's in the trade. In crates of this size, as they are now packed by hand, seven layers are employed, the first and seventh layer including eleven stalks each while the five intermediate layers include ten stalks. Referring again to Fig. 1, as the seventh layer of eleven stalks is dumped or at some suitable time thereafter, as for example during assembly of the first layer of the next crate, a crate shifting mechanism 59 is automatically operated to shift the previously filled crate away from the assembling mechanism and move an empty crate beneath the dump plates 56 and 57. As shown, the crates are supported by pairs of oppositely extending arms 60, 61, 62 and 63, filled crates being illustrated at 64 and 65, while an empty crate is shown at 66. The crate 67 is in the process of being packed. Filled crates 64 and 65 may be readily removed and placed upon a conveyor for transmission to a suitable location for precooling and subsequent shipment. A timing or governing mechanism 68 is associated with each of the machines for controlling the timing of the various operations incident to the packing of the celery stalks, as will appear more fully hereinafter.

With the above general description of the manner of operation of the automatic sizing and packing machine of the present invention in mind, reference will now be had to the remaining figures of the drawings illustrating in detail one machine adapted to pack celery stalks known in the trade as Number 6's.

Figure 2:
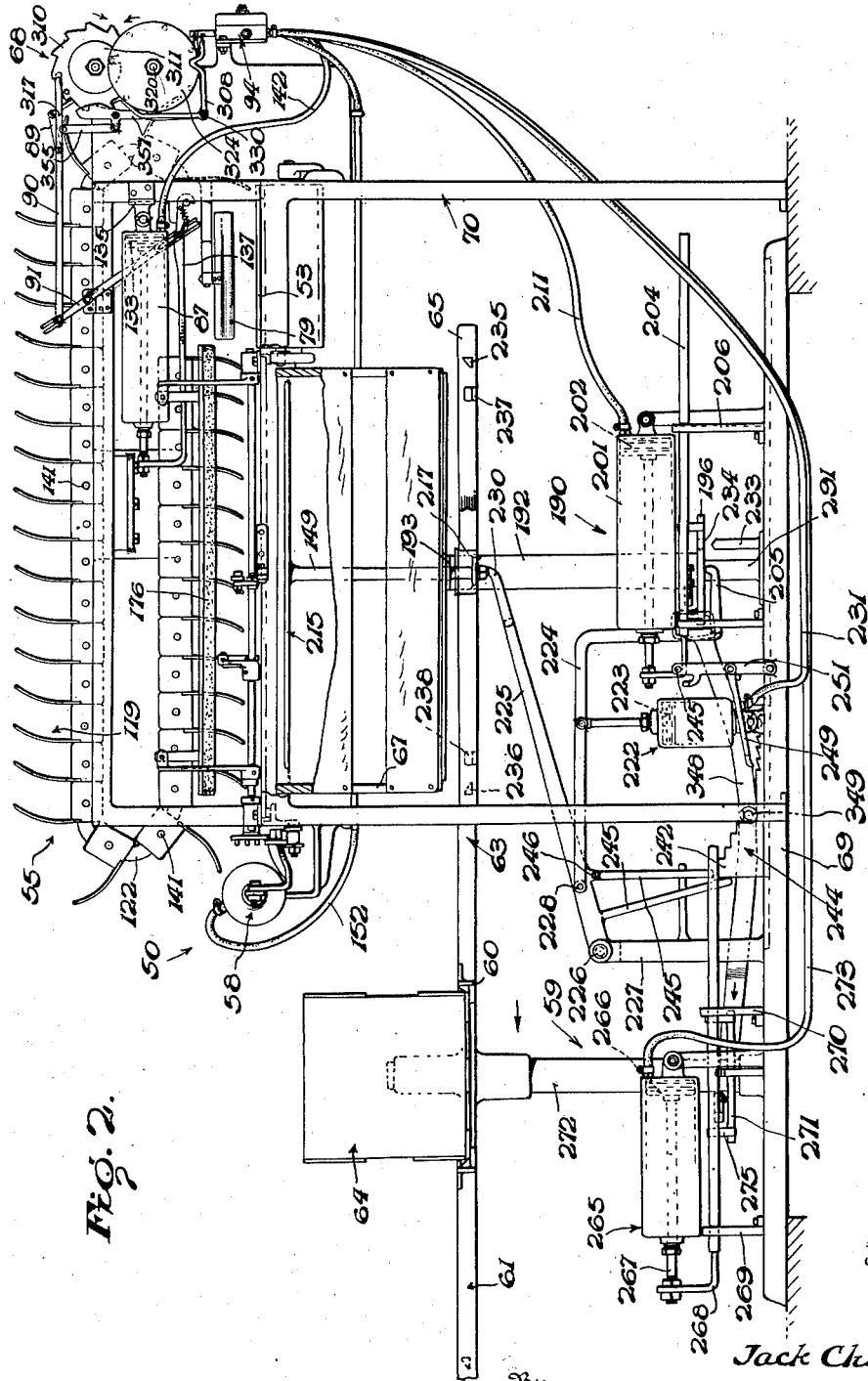
Fig. 2 is a side view of one of the machines of Fig. 1.

Referring more particularly to Fig. 2, a side view of the machine 50 is illustrated therein and includes a base 69 on which various parts of the machine are mounted. The machine also includes a suitable frame 70 for supporting other parts in cooperative relationship including the assembling mechanism 55, dumping mechanism 58 and the timing mechanism 68. Other parts of this frame will be referred to as the description of the various elements proceeds.

Figure 4:
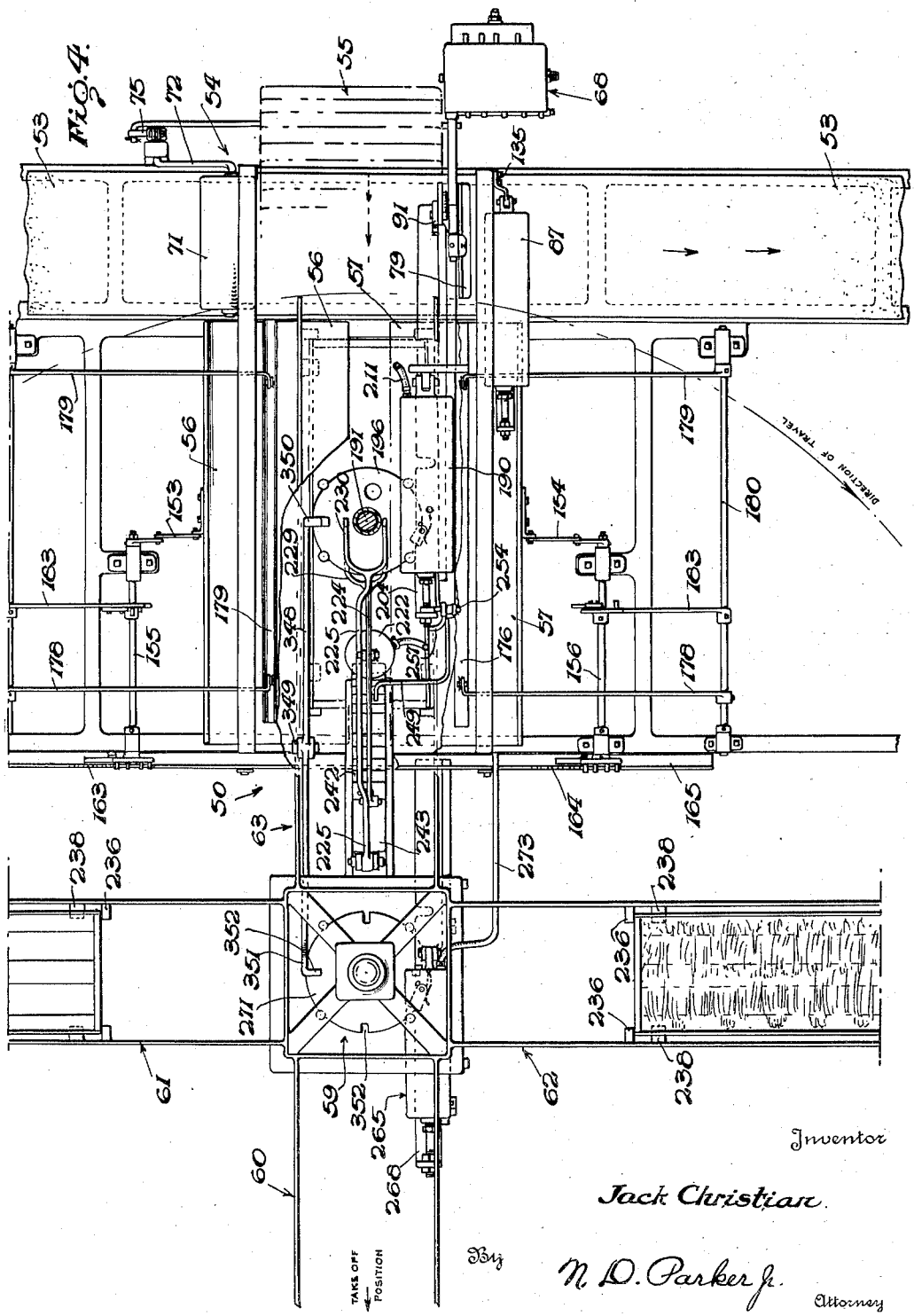
Fig. 4 is a plan view of the sizing and packing machine, certain parts having been removed in order to illustrate the construction more clearly.
Figure 5:
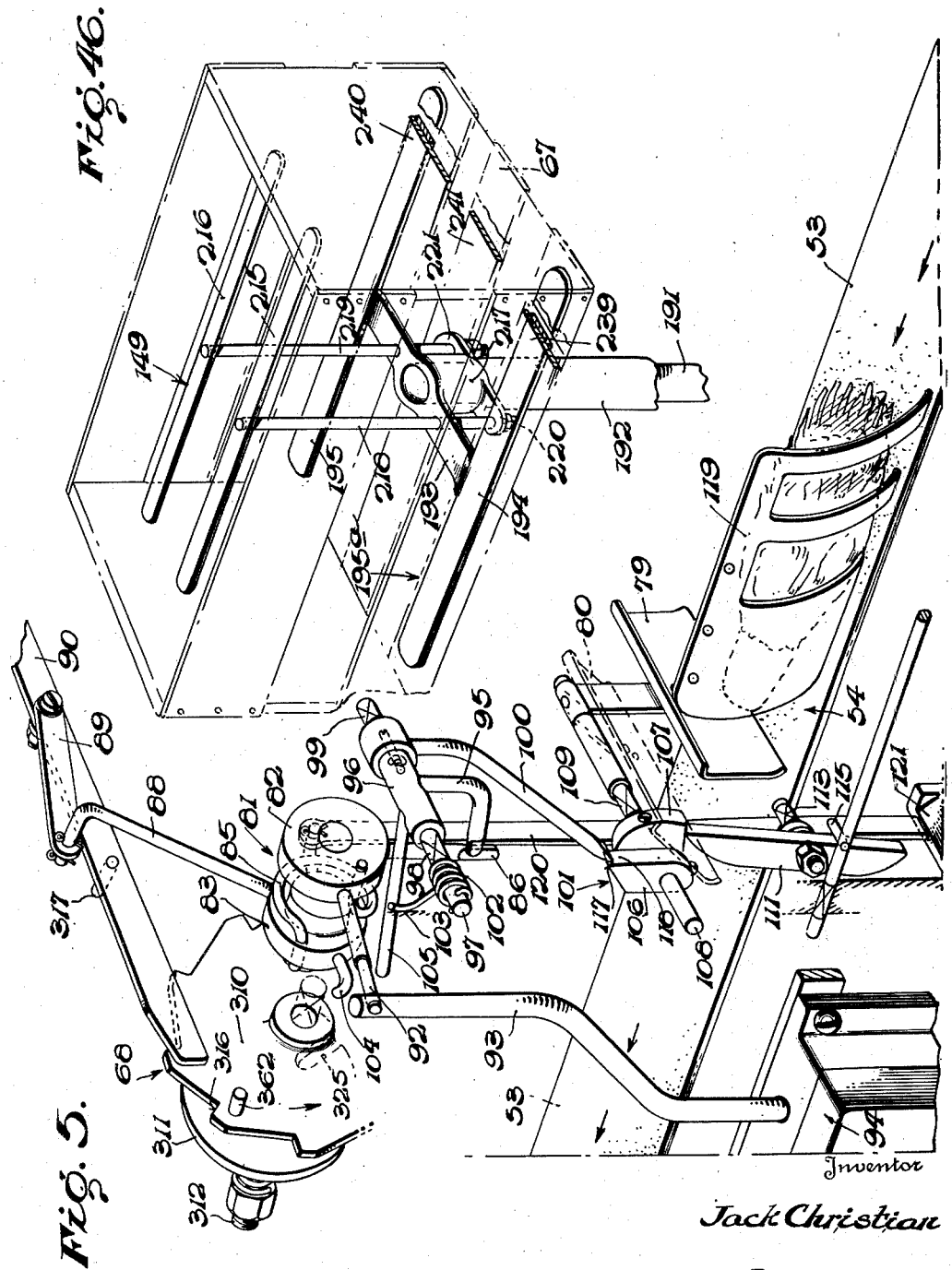
Fig. 5 is a partial perspective view of a portion of the sizing and ejecting control device.
Figure 6:
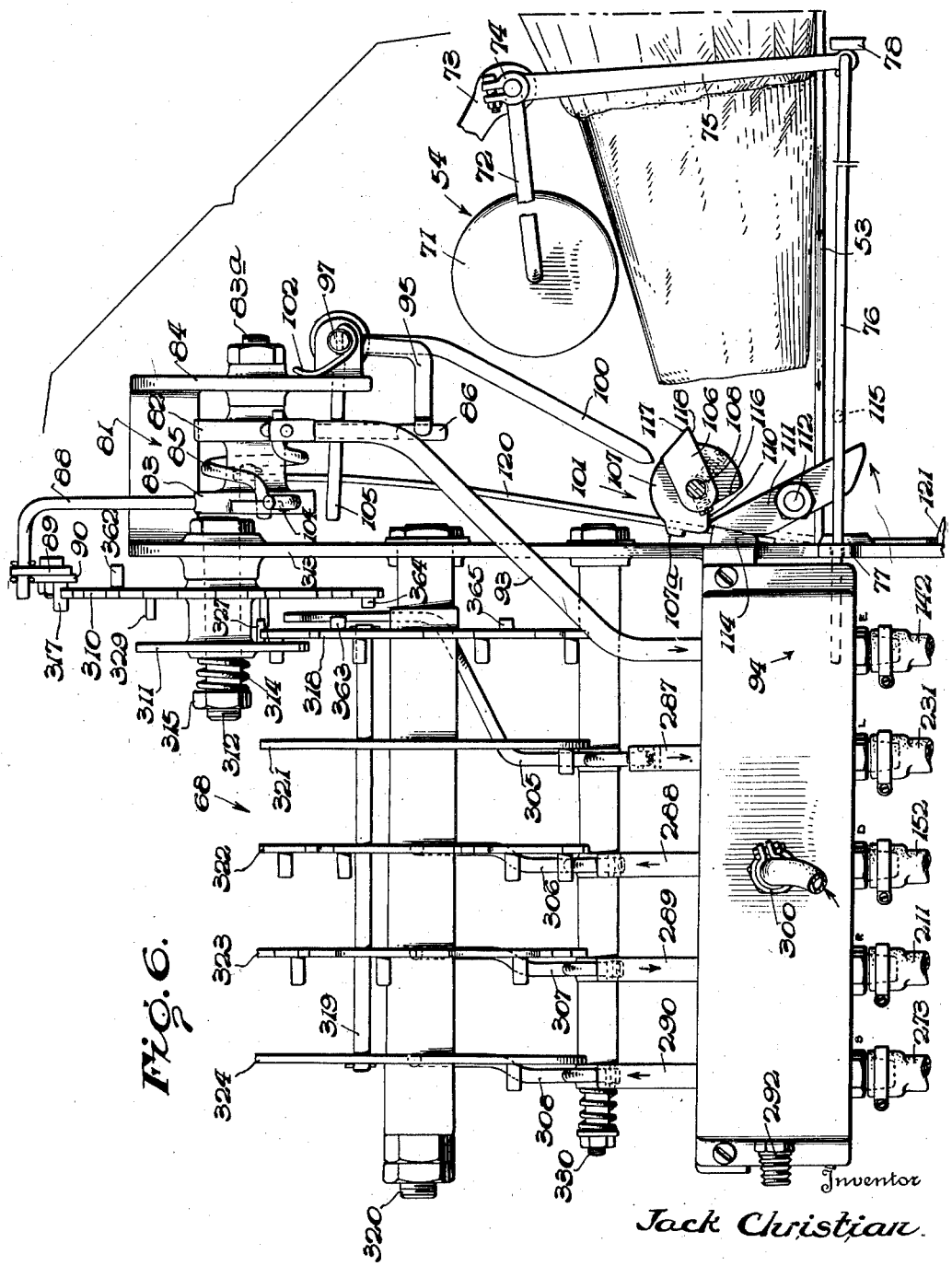
Fig. 6 is a partial front view of certain of the parts of Fig. 5 and illustrating also the timing or governing mechanism for controlling the various operations of the machine.

As heretofore stated, the automatic sizing and packing mechanism of the present invention is associated with a traveling conveyor on which the celery stalks are placed in longitudinally spaced alignment. Referring to Figs. 4, 5 and 6, the celery stalks are conveyed to the mechanism on belt 53, and, during their travel, come first to the sizing mechanism 54. This mechanism includes a sizing roller 71, Figs. 4 and 6, which is suitably rotatably mounted upon an arm 72 in spaced relation with respect to and overlying the belt 53. One end of the arm is pivotally supported in a portion 73 of the frame and this end is adjustably secured as by means of connection 74 to a lever 75. The lower end of the latter is connected to a longitudinally movable rod 76 which is so mounted as to be reciprocable and guided in a portion 77 of the frame. Normally, the weight of the sizing roller 71 maintains the above described parts in the position shown in Fig. 6 wherein the lower end of lever 75 abuts a suitable stationary stop 78. However, in the event that a celery stalk of sufficient size contacts and moves roller 71 upwardly, it will be understood that the rod 76 is moved to the left, as viewed in Fig. 6, for a purpose which will appear hereinafter. In view of the adjustable connection 74 between the lever 75 and arm 72, it will be readily understood that the relative positions of these two parts may be adjusted in order to permit variation of the normal distance between roller 71 and the belt. This adjustment is provided so that each of the various machines may be calibrated to size celery stalks of the desired diameters.

Assuming that a celery stalk of sufficient size conveyed along belt 53 contacts roller 71 and moves the latter upwardly a slight amount as above described, the present invention comprehends the provision of a novel arrangement for subsequently ejecting from the belt the stalk which has thus contacted and moved the roller. The arrangement provided is, moreover, such that all of the stalks which thus successively contact and move the sizing roller are ejected from the conveyor at the same point, and, thus ejected and conveyed to one side of the conveyor, will be in precise alignment. This will materially facilitate the assembly of the stalks and the subsequent dumping of a layer of stalks into the crate as heretofore described. To this end, a gate 79 is positioned to overlie the belt 53 following the sizing roller 71, Figs. 1 and 5. Normally, when the roller 71 is not contacted and moved, the gate is maintained in an elevated position, as indicated at 80 in dotted lines, Fig. 5. Under these conditions, celery stalks of a size insufficient to contact and move the roller 71 will proceed along with the belt 53 and pass beneath the gate 79 in its thus elevated position, and such stalks will proceed to the next machine wherein the roller 71 is located closer to the belt 53. However, if, as above indicated, the roller 71 is contacted and moved by a stalk of sufficient size, the mechanism provided by the present invention will operate to move the gate 79 to the position shown in full lines in Fig. 5, and, as soon as the celery stalk which operated the roller 71 reaches and contacts the gate 79, the ejecting and assembling mechanism 55 will be automatically placed in operation to eject the stalk to one side of the conveyor.

In order to control the action of the above mentioned gate and the operation of the ejecting and assembling mechanism, there is provided a novel control device including a spring mechanism 81, see Figs. 5 and 6. As shown, this mechanism includes a pair of discs 82 and 83 freely rotatably mounted upon a stub shaft 83ª secured to a portion 84 of the frame. These discs are interconnected by a spiral spring 85, the spring being of such nature as to be capable of action in opposite directions. The disc 82 has secured thereto a depending controlling finger 86. Disc 83 is rotated in opposite directions in response to opposite movements of an ejector motor 87, Fig. 2, the connections for securing such movements including an arm 88, a link 89 and a member 90 operatively associated with the upper end of a lever 91 moved in response to energization of the motor 87.

Also connected to the disc 82 is a pin 92 operatively connected with a valve operating element 93, the latter controlling a valve device 94, Fig. 24, for effecting energization of the ejector motor 87 in opposite directions. The latter is preferably operated in one direction by application of compressed air thereto and in the other direction by exhausting of the compressed air and application of vacuum to the same end of the motor, and, as shown in Fig. 5, the parts heretofore described are in the normal position wherein the ejecting motor 87 is completely energized in one direction by a suitable source of vacuum. Finger 86 depending from the disc 82 cooperates with a finger 95 secured to and projecting from a sleeve 96 secured to a shaft 97, the latter being suitably rotatably supported in a portion of the frame through bearing portions 98 and 99. Also secured to the shaft 97 is a finger 100 which is associated with a tripping mechanism 101 for controlling the operation of the gate 79. A spring 102 having one end secured to the shaft 97 and its other end bearing against a stationary portion 103 of the frame normally urges the shaft 97 in a clockwise direction, as viewed in Fig. 5, in order to maintain the parts 95 and 100 in the position shown in this figure. Sleeve 96 and finger 95 secured thereto may be moved in a counterclockwise direction through cooperation between a finger 104, carried by the disc 83, and rod 105, secured to sleeve 96, this action being effected when the disc 83 is rotated in the proper direction as to bring the parts 104 and 105 into engagement.

More particularly, the tripping mechanism 101 includes a pair of cams 106 and 107 secured to a shaft 108, the latter carrying the gate 79 and being suitably rotatably mounted in a portion of the frame as by means of a bearing portion 109. As heretofore mentioned, the gate 79 is normally in such a position as that indicated at 80 in Fig. 5, and, under these conditions, shaft 108 occupies the position as shown in Fig. 6. Gravity acting upon the gate 79 will tend to move the shaft 108 in a counterclockwise direction, as viewed in this figure. This tendency is counteracted and the gate 79 positively held in its elevated position through cooperation between a cam surface 110 on cam 107 and the upper end of a member 111, the latter being suitably carried on a stub shaft 112 rotatably mounted as by bearing 113 in a portion of the frame. As shown, member 111 bears against a suitable stationary stop 114 when the parts occupy the position shown in Fig. 6. As the rod 76 is moved to the left, as viewed in Fig. 6, in response to movement of roller 71 by a celery stalk of proper size, a pin 115 carried by the rod 76 engages the lower portion of member 111 and moves the latter in a clockwise direction to the position illustrated in Fig. 5. During such clockwise movement of the member 111, the upper end thereof cooperates with the cam portion 110 and also cam portion 116 of the cam 107 and it will be readily understood that, during this operation, as the upper end of the member 111 passes beyond a line joining the centers of shafts 108 and 112, the gate 79 will drop by gravity to the position illustrated in Fig. 5. As shown in Fig. 6, an abutment 107a may then engage stop 114. During this operation, the outer end 117 of cam 106 slips by the lower end of the finger 100 so that the latter is placed in cooperation with the surface 118 of the end 117. During the movement of the end 117 past the end of finger 100, the latter, sleeve 96 and finger 95 are moved a slight degree in a clockwise direction, as viewed in Fig. 5. This action, however, serves to merely move the end of the finger 95 further beyond the end of finger 86. At this time, it is desired to point out that, with the parts occupying the position shown in Fig. 5, the disc 82 is prevented from clockwise movement through the abutment of finger 86 with finger 95 and that, during the vacuum controlled return of the ejecting cylinder, moving disc 83 in a clockwise direction, the spring 85 has been tensioned. Were it not for the cooperation between the fingers 86 and 95, the disc 82 would be rotated in a clockwise direction. It is thus seen that, with the tension in the spring 85, should the finger 95 be moved out of contact with finger 86, the disc 82 would be free to rotate in a clockwise direction with a snap action in order to promptly and quickly move the valve operating rod 93 upwardly, as viewed in Fig. 5, in order to move the valve 94 to a position to supply air pressure to the ejecting cylinder 87.

In order to effect the release of the interlock between the fingers 86 and 95, the parts are so arranged that, as soon as a sized celery stalk engages the plate 79 and moves the same a very slight distance, the cam 106 will move in a clockwise direction, as viewed in Fig. 5, and the end 117 thereof will move the finger 100 to such an extent that the latter, sleeve 96 and finger 95 will be moved in a counterclockwise direction about the shaft 97. Prior to the time when the finger 100 slips past the end 117 of the cam 106, the movement of the parts 100, 96 and 95 will be sufficient to bring the outer end of the last named element out of contact with the lower end of the finger 86. Thus, the disc 82 will be released and will rapidly operate the valve 94 under the influence of the energy stored up in the spring 85 and supply compressed air to the ejecting cylinder 87. By means of mechanism to be described hereinafter and including an ejecting assembly element 119, Fig. 5, the celery stalk actuating the gate 79 will be promptly and effectively removed laterally from the belt 53.

It is desired to call attention to the fact that, as the ejecting motor 87 operates in response to the application of compressed air thereto, as above described, the lever 91 will be moved in a clockwise direction, as viewed in Fig. 2, in order to advance the member 90 and parts connected thereto, see Fig. 5. However, it will be understood that, as soon as the end of finger 100 passes by the end 117 of the cam 106, the spring 102 acting on shaft 97 will return the latter and parts connected thereto to the position shown in Fig. 6. Hence, the finger 95 will be returned to a position for engagement with the lower end of finger 86 as the latter is moved in a counterclockwise direction in response to advance movement of the member 90, counterclockwise movement of the disc 83 and coiling of the spring 85 in the opposite direction. It is pointed out that the above described movement of disc 82 to effect the rapid opening of the valve 94 is relatively slight and, after the finger 100 has cleared the cam 106 as aforesaid, the end of finger 95 just slips behind the lower end of the finger 86. Hence, during the ejecting movement of the ejecting motor and the winding up of spring 85, as above described, the finger 86 will be brought into contact with the finger 95 and disc 82 will be prevented from rotating counterclockwise. Valve 94 will be maintained in its compressed air supplying position under these conditions.

During the energization of the motor 87, as above described, the member 111 is returned to the position shown in Fig. 6. The means for effecting this result includes an arm 120 secured to the disc 83 and adapted to be raised during the ejecting movement to bring a return cam 121 into engagement with the lower end of the member 111, thus camming the latter to the normal position. It will also be understood that, during this latter operation, cams 106 and 107 are returned to normal position and that the gate 79 is raised for a subsequent operation. As the continued counterclockwise movement of the disc 83 occurs, and the stressing of spring 85 continues, the pin 104 will finally contact the member 105 secured to sleeve 96 and the latter and parts secured thereto will be moved in a counterclockwise direction. This action will move the lower end of the finger 95 out of contact with respect to the rear portion of the finger 86, as viewed in Fig. 5, whereupon the energy stored in the spring 85 will rapidly and promptly rotate the disc 82 in a counterclockwise direction in order to move the valve operating rod 93 and valve 94 downwardly. This action of the valve occurs at about the limit of the ejecting stroke of the ejecting motor 87 and cuts off the supply of compressed air to the motor and connects the same to the source of vacuum. Thus, the ejecting cylinder is promptly returned to its normal position, and, since the lower end of the finger 95 has now slipped in front of finger 86 through operation of the spring 102, the disc 82 is prevented from rotating in a clockwise direction as the disc 83 is rotated in this direction in order to store energy in the spring 85 for a subsequent sizing and ejecting operation as heretofore described.

The assembling and ejecting mechanism 55 is preferably constructed in such a manner as to be capable of intermittent operation in the same direction for ejecting and assembling stalks of celery as they are sized by the roller 71. More particularly, and as illustrated in Figs. 7 to 10 inclusive, such mechanism includes a plurality of assembly or ejecting elements 119 adapted to be removably mounted upon a pair of spaced-apart endless guides or tracks 122 and 123. As shown, each ejector element 119 is provided with a support 124 to which is secured an outwardly extending plate having a continuous section 125 and one or more tines 126. The tines and sections 125 are suitably curved, as illustrated in Figs. 7, 9 and 10, to conform generally with the curvature of the celery stalks, the section 125 being adapted to cooperate with the butt ends of the stalks while the tines perform the function of cooperating with the leafy parts of the stalks. The supports 124 for the ejector elements are provided with slotted openings 127, 128 and 129 and similarly spaced slots 130, 131 and 132 are formed in the guides 122 and 123 in such a manner that, as the openings 127, 128 and 129 are placed over the aforesaid slots, the supports will slip downwardly until the openings register with the guides. The support may then be slid forwardly, as illustrated in Fig. 9, and another support fitted onto the guides. In this manner, an endless series of ejector elements are easily and readily associated with the tracks and, due to the construction of the openings 127, 128 and 129, these elements may be moved in one direction about the track in an intermittent manner and without danger of becoming disconnected with the guides. The latter may preferably be constructed in such a manner as to have a slight incline as the assembly elements are drawn across the conveyor for the purpose of ejecting sized celery stalks, this arrangement facilitating the slight lifting action of the assembly elements exerted on the stalks during ejection thereof in order to lift them slightly out of contact with respect to the conveyor belt. This slight incline is illustrated in Figs. 9 and 10 at the lower portion thereof and directly above the belt 53. A suitable supporting mechanism including plates or arms 122ᵃ and 123ᵃ is provided for mounting the assembly mechanism on the frame.

In order to associate the ejecting elements with the ejecting motor 87, the latter is provided with a piston 133 housed within a cylinder 134, the latter being suitably mounted at one end upon a bracket 135 fixed to the frame member 70, Figs. 2 and 10. A piston rod 136, connected to the piston 133, extends outwardly through the opposite end of the cylinder and has secured thereto an actuating member 137 to the end of which a hook-shaped pawl 138 is pivoted. Normally, the pawl is resiliently urged as by means of a spring 139 against a stop 140 carried by the member 137, this construction serving to limit the clockwise movement of the pawl, as viewed in Fig. 10. The construction is such, however, that, as the member 137 is moved to the right prior to reaching the position shown in Fig. 10, the pawl is cammed upwardly over and drops into engagement with a pin 141 carried by each of the ejector elements so as to be capable of positively drawing the engaged element laterally across the belt 53 to eject a sized celery stalk upon application of the compressed air to the ejecting motor 87 in the manner heretofore described. The cylinder 134 is provided with a fluid connection 142 through which compressed air and vacuum, controlled by valve 94, are selectively conducted in order to move the piston to eject the celery stalk and to subsequently return the piston 133 to the normal position shown in Fig. 10.

Lever 91, referred to heretofore, is pivotally mounted intermediate its ends on a stub shaft 143 mounted on a suitable portion of the frame, the upper end of the lever 91 being connected to the member 90 while the lower end is connected with the member 137 at a pivot 144 which associates the pawl 138 with the member 137. With such an arrangement, it will be readily perceived that, as fluid pressure is conducted through conduit 142 to the cylinder 134, the piston 133 will be moved to the left, as viewed in Fig. 10, and the piston rod 136 and member 137 will be moved in the same direction. The engaged ejecting element will thereupon be moved along the guides 122 and 123 and promptly moved across the belt 53 to engage and eject the sized stalk of celery, and, as the ejecting element so moved clears the belt, it will engage the previously moved ejecting element and slide the entire assembly of elements a predetermined distance around the guides 122 and 123, see Fig. 9. As soon as the ejecting operation has been completed and the valve 94 is moved to a position to supply vacuum to the conduit 142 in the manner heretofore described, the piston 133 will be drawn back to the opposite end of the cylinder 134, thus moving member 137 and pawl 138 to the right, as viewed in Fig. 10. The next succeeding ejecting element will then be in a position where the pin 141 carried thereby may be interlocked with the pawl 138 for a subsequent ejecting action which will not occur until another celery stalk operates the sizing roller 71. It will be understood from Fig. 8 that the pin 141 projects outwardly beyond the edge of plate 125 so as to be readily engageable by the pawl 138. The construction is also such that, after members 137 and 138 have moved one of the ejecting elements through an ejecting stroke, these parts may return to the position shown in Fig. 10, leaving the ejecting element in its new ejected position.

In sizing and packing a crate of celery stalks of No. 6 size, it has been heretofore pointed out that, by the present invention, the first layer of eleven stalks is assembled as a unit and then dumped into the crate or form. Thereafter, five layers of ten stalks each are assembled to be followed by the last layer of eleven stalks. Referring more particularly to Figs. 4, 11 and 14 to 16 inclusive, the assembling and dumping operations will now be specifically described. As illustrated in these figures, as the successively sized stalks are ejected, as heretofore set forth, they are confined between adjacent assembly elements 119, as shown in Fig. 14. As these elements are moved by the ejector motor 87, they move the aligned celery stalks across the pair of dump plates 56 and 57, the latter being normally in the position shown in Fig. 11 but capable of outward movement with respect to each other for the purpose of dumping a layer of celery at the proper time during operation of the mechanism. These dump plates are slidably mounted on frame portions 147 and 148, as illustrated in Fig. 14. As will also appear from the latter figure, eleven stalks constituting the first layer of celery have been assembled on the dump plates and are ready to be released into an empty crate 67 positioned centrally beneath the plates and preferably the layer of celery will be received by a celery receiving device 149. Normally, this latter device is positioned as shown in Fig. 14 so that the layer of stalks, when dumped, will not have to drop to the bottom of the crate. Mechanism to be hereafter described is automatically operable as the successive layers are dumped to lower the device 149, and, for example, as shown in Fig. 15, such device has been lowered following the reception of the first layer of celery to the position shown and it will be readily perceived that the second layer, ready to be dumped, as shown in this figure, will only drop through substantially the same distance as the first layer when the dumping operation occurred in Fig. 14.

Means are provided for operating the dump plates 56 and 57 by fluid pressure, and, as shown in Fig. 11, such means include a dumping motor 58 including a cylinder 150 having a piston 151 therein and normally occupying the position illustrated during assembly of a layer of celery stalks. The cylinder 150 is provided with a combined compressed air and vacuum conduit 152, controlled by valve 152ª, Fig. 24, and, as vacuum is conducted through such conduit, the piston 151 takes the position shown. Each of the dump plates 56 and 57 is connected through respective pivoted link devices 153 and 154 with shafts 155 and 156, the latter being rotatably mounted in a portion of the frame mechanism in any suitable manner, as by means of bearing portions 157 and 158. From this construction, it will be perceived that, in the event shafts 155 and 156 are rotated one complete revolution in the same direction from the position shown in Fig. 11, the link devices 153 and 154 will be effective to slide the dump plates 56 and 57 apart a sufficient distance to dump the layer of celery stalks resting thereon, and to then return the plate to the position illustrated.

In order to interconnect shafts 155 and 156 with the dumping motor 58, the said shafts are provided with sprocket wheels 159 and 160 respectively, these wheels having respective pins 161 and 162 cooperable with teeth 163 and 164 formed in an actuating angle bar 165 fixedly secured by bracket 166 to a piston rod 167 connected to the piston 151. As shown in Fig. 14, the bar 165 may be supported for reciprocable movement from the frame 147 as by means of one or more supporting members 168. The arrangement is such that movement of piston 151 to the opposite end of the cylinder 150 in response to the application of compressed air to conduit 152 will move the bar 165 to the left, as viewed in Fig. 11, and the cooperation of the parts 163, 161 and 164, 162 will move the sprocket wheels 159 and 160 one complete revolution to effect the aforesaid dumping movement of the dump plates and return of these plates to the initial position. The above described mechanism is, moreover, such that, when the compressed air to conduit 152 is cut off and vacuum is applied thereto, the piston 151 and bar 165 will be returned to the position illustrated without effecting any movement of the sprocket wheels 159 and 160. Thus, the parts will be returned for subsequent dumping operation. While there has been illustrated a sprocket wheel and rack construction for operating the shafts 155 and 156, it will be readily understood that any suitable mechanism may be utilized for rotating these shafts in such a manner as to effect one revolution of movement in response to a power stroke of the dumping motor.

Referring to Fig. 13, the parts are shown just after the bar 165 has returned to normal position. In this figure, it will be perceived that a pair of the pins 162 have been connected by a bar 169 which slides along the top of teeth 164 as the bar is returning to normal position. This construction avoids any possibility of any of the pins 162 being engaged by the teeth in order to effect an undesired movement of the sprocket wheel. A gravity actuated pawl 170, pivotally mounted at 171 to the bar 165, has an end 172 normally in engagement with an abutment 173 on the wheel 160. Thus, as the bar 165 is moved to the right, as viewed in Fig. 13, cooperation between the end 172 and abutment 173 will cause counterclockwise movement of the wheel 160 and the left-hand extremity of the bar 169 will be actuated by the first tooth 164 and thus a drivable connection will be established between the bar and wheel. As the bar continues movement to the right, as viewed in this figure, in response to movement of the piston 151, the wheel 160 will make one complete revolution, due to the cooperation of teeth 164 and pins 162, and will be returned to the position shown in Fig. 13, the bar 169 then resting upon a portion 174 of the bar 165. Thus, the complete revolution of the sprocket wheel 159 referred to above will have taken place and the bar 165 may be returned to normal position without effecting any further movement of the sprocket wheel. It will be understood that a similar gravity actuated pawl 175 is associated with the sprocket wheel 159 in precisely the same manner so that simultaneous rotation of the shafts 155 and 156 will occur during a power stroke of the dumping motor 58.

While, in many instances, a dumping of the celery stalks by gravity alone may be sufficient, it has been found desirable to positively project or impel the layer of stalks as soon as the dump plates have opened a sufficient distance to permit the layer to drop by gravity. Such a construction enables the layer to be projected downwardly into the crate more rapidly than would be effected by gravity dropping and, moreover, insures that the stalks will be maintained in proper assembled position. Thus, any possibility of one stalk becoming disaligned with respect to another is avoided and the layer is deposited in the crate in a neat and aligned fashion. To this end, the present invention includes a pair of tamper bars 176 and 177, these bars being normally positioned, as shown in Fig. 11, to be located just above the butt and leafy ends of the stalks as they are being assembled in a layer on the dump plates 56 and 57. Tamper bar 176 is supported adjacent its opposite ends by arms 178 and 179, the opposite ends of these arms being secured to a shaft 180 rotatably mounted as by means of bearing portions 181 in a suitable part of the frame. An actuating arm 183 adjustably secured to the shaft 180 is provided with an end 184 adapted to cooperate with a cam 185 secured to the shaft 156. End 184 has secured thereto a member 186 provided with a hooked end 187 with which a pin 188 carried by the cam cooperates. With this construction, as the dumping motor 58 is energized to rotate shaft 156, as heretofore described, cam 185 also rotates and the surface of this cam during its initial movement is so formed as to cause little or no movement of the shaft 180 and tamper bar 176. However, when the dump plate 57 has been moved, through rotation of shaft 156, to a distance such that the plate releases the butt ends of the layer of celery stalks, pin 188 engages end 187 of the arm 186 to rapidly move the arm 183 downwardly, as viewed in Fig. 11, to effect corresponding rapid downward movement of the tamper bar 176 through the shaft 180 and members 178 and 179. Cam 185 is so contoured that, when this action is effected, the downward movement of the arm 183 can take place. Thus, as the butt ends of the celery stalks are being released by removing the dump plate 57, the tamper bar 176 is energized to positively depress the butt ends downwardly so as to maintain them in precise alignment as they are forced into the crate and upon the celery receiving device 149.

Substantially the same construction is provided for controlling the action of the tamper bar 177 which cooperates with the leafy ends of the stalks with the exception that the member 186 is located on the opposite side of the cam 185 in order to effect downward movement of the arm 183 as the cam rotates in a clockwise direction during energization of the dumping motor 188. If desired, the tamper bar 176 may be provided with a rubber or felt buffer 189 in order to avoid any tendency of scarring the butt ends of the celery during the dumping of the layer. Also, it will be observed that the arms 183 controlling the movement of the tamper bars 176 and 177 are adjustably connected to the shaft 180, thus permitting a variation in the initial adjustment of the position of the tamper bars and the extent of downward travel during operation.

Figure 3:
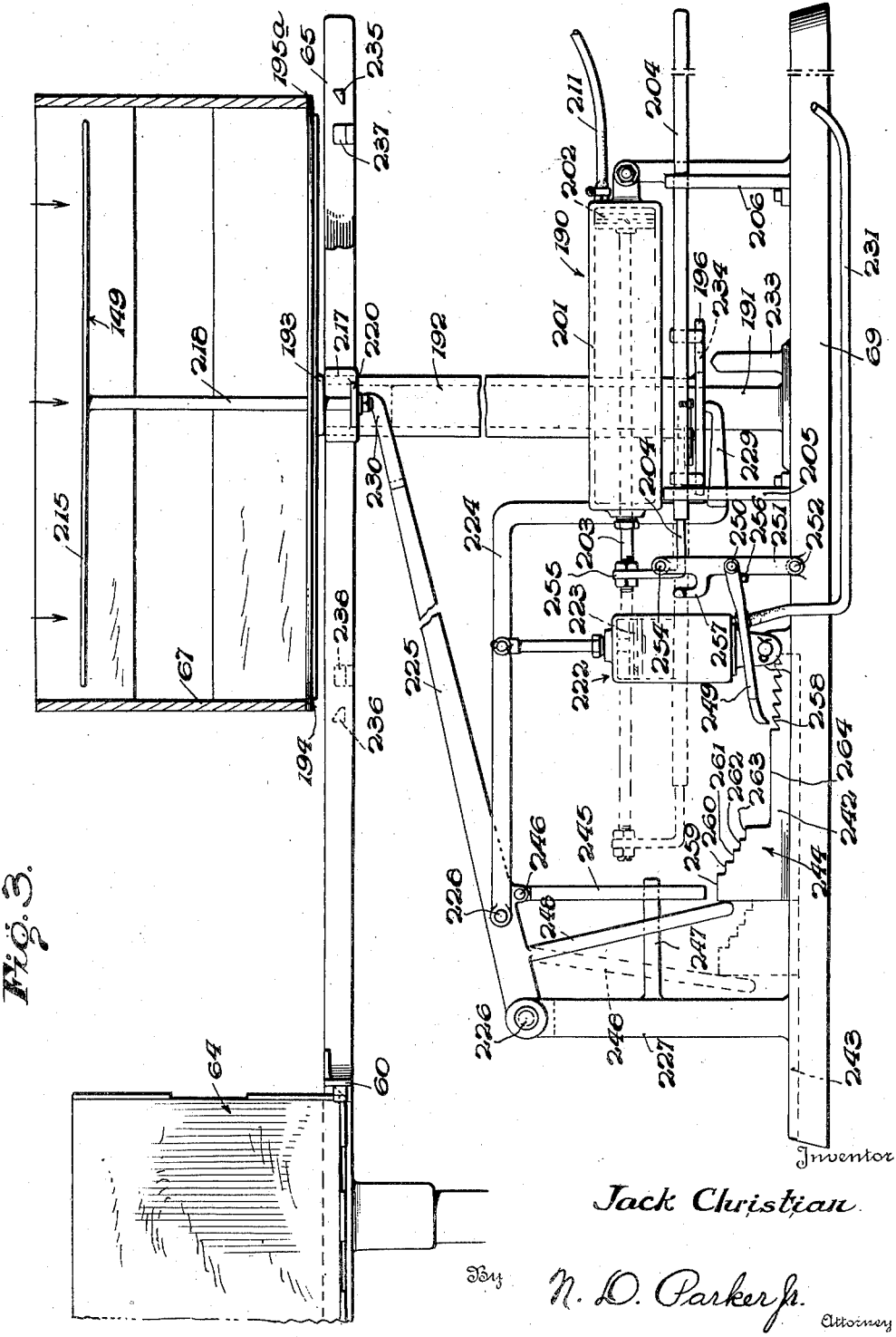
Fig. 3 is a partial side view of the crate shifting and crate supporting mechanism.

In order to obtain a proper pack, reference has heretofore been made to the practice in hand packing celery wherein the stalks of each layer in the crate have been reversed with respect to each of the stalks of adjacent layers. Means are provided by the present invention for accomplishing this result and include a construction for reversing the crate after each layer is dumped so that the stalks of each dumped layer will be reversed as regards the stalks in the next layer to be dumped. As illustrated, see Figs. 2, 3, and 17 to 20 inclusive, the arrangement provided by the present invention includes a construction wherein the crate, positioned beneath the dump plates 56 and 57, is rotated through 180° following the dumping of each layer of celery stalks. In these figures, a crate reversing power motor 190 is employed for effecting the aforementioned function in proper timed relation during the operation of the machine. Secured to base 69 is a supporting pedestal 191 upon which a sleeve 192 is mounted. To the upper end of the sleeve is secured a laterally extending arm 193 having its outer ends integrally connected with a pair of parallel arms 194 and 195, these arms forming an H-shaped crate support form 195ᵃ, Fig. 46, adapted to receive the bottom of a crate or form into which the celery is packed. The empty crate 67 is illustrated in Fig. 3 as being in its normal filling position wherein it is raised upwardly off of the crate supporting arms 63 by a mechanism which will be described hereinafter. When in this position, the sleeve 192 and crate supported by arms 193, 194 and 195 may be rotated through 180° following the dumping of each successive layer upon the celery receiving device 149.

In order to rotate the crate to reverse the position of the same as above referred to, the lower end of the sleeve 192 has affixed thereto a disc 196 upon the periphery of which a plurality of pins 197, 198, 199 and 200 are affixed, see Figs. 17-20. Reversing motor 190 includes a cylinder 201 having a piston 202 therein, the latter having a piston rod 203 secured thereto and extending out of one end of the cylinder and being connected to an actuating member 204 suitably guided as by means of members 205 and 206 secured to the base 69. Actuating member 204 carries a pawl 207 normally urged in the position shown in Fig. 17 as by a spring 208, this construction being provided for enabling contact between the pawl 207 and pin 199 and consequent movement of the disc 196 in a clockwise direction upon movement of member 204 to the left, as viewed in this figure. As shown in Fig. 18, pawl 207 has contacted and moved pin 199 slightly and has rotated the disc 196 a sufficient amount to bring pin 198 slightly into a slot 209 formed in the member 204. Thus, continued movement of member 204 to the left, as viewed in this figure, will continue rotation of the disc 196 through cooperation between pin 198 and slot 209 to the position shown in Fig. 19 whereupon pin 197 will enter a second slot 210 formed in the member 204. Continued movement of the latter member to the left will move the parts to the position shown in Fig. 20 where a pin 197 has been cammed out of slot 210 and pin 200 rests upon a straight portion of member 204. Under these conditions, it will be readily observed that the disc 196, sleeve 192 and the crate supported on arms 193, 194 and 195 have been moved a distance of 180°, thus completely reversing the position of the crate with respect to the assembling mechanism and placing the crate in readiness for receiving the next layer of celery stalks. In order to effect the above action, the distance between pins 197 and 200 and between 198 and 199 is the same, but this distance is greater than that between pins 197 and 198 and between 199 and 200. Also, the slots in member 204 are arranged to cooperate with the pins, as described. Compressed air and vacuum are supplied to the crate reversing motor 190 through a conduit 211 and the supply of fluid energy is controlled by a valve device 211ᵃ energized through the timing mechanism 68 in a manner which will appear more fully hereafter.

In packing celery stalks into crates in accordance with the present invention, it has been found to be highly desirable to drop each layer of stalks, as they are assembled, a limited distance only rather than to drop the first layer, for example, the complete depth of the crate. Such a construction not only prevents undue scarring and bruising of the stalks as they are dumped but also serves the advantage of maintaining the stalks in alignment so that each layer as it is dumped fits compactly within the crate. The present invention, accordingly, provides novel means for securing the foregoing advantageous results and preferably such means is incorporated in the mechanism which serves to lift an empty crate upwardly from the supporting arms into a position ready to be filled by operation of the sizing, assembling and dumping mechanisms. Referring more particularly to Figs. 3 and 46, such means includes the celery receiving device 149 comprising a pair of arms 215 and 216 supported by a sleeve 217 through the medium of a pair of rods 218 and 219. The sleeve 217 is slidable upon sleeve 192 and is provided with a pair of laterally extending ears 220 and 221 to which the rods 218 and 219 are affixed. The latter are slidable through suitable openings provided in the laterally extending arm 193 of the crate supporting form 195ᵃ, and, with this construction, it will be readily perceived that the celery receiving device 149 is movable upwardly and downwardly with respect to the sleeve 192 and the crate support. Preferably, the arm 193 is bent downwardly out of the horizontal plane of the arms 194 and 195, see Fig. 46, so that, when the celery receiving device 149 is in its lowest position, the arms 194, 195, 215 and 216 all lie substantially in the same horizontal plane.

In order to move the crate support and celery receiving device upwardly off the supporting arms 63, Fig. 3, a lifting motor 222 is provided, the said motor having a piston 223 connected through a system of levers for the purpose of operating the crate support and receiving device. As shown, the lever system includes a pair of levers 224 and 225, the latter being pivotally mounted at 226 to a base standard 227 while the lever 224 is pivotally mounted at 228 to the lever 225 and is provided with a yoke 229 straddling the pedestal 191 and adapted to bear against the bottom of disc 196, see Figs. 3 and 4. The outer end of lever 225 is also provided with a yoke 230 straddling the sleeve 192 and adapted to bear against the lower portion of the sleeve 217. Thus, it will be perceived that the lever 224 is provided for moving the sleeve 192 upwardly, as viewed in Fig. 3, while the lever 225 serves to control the movement of the sleeve 217 and the celery receiving device 149 secured thereto.

As illustrated in Fig. 3, the crate support 195ª and celery receiving device 149 have been moved upwardly to a position where the crate 67 is ready to receive the first layer of celery after it is sized, assembled and dumped by the mechanism heretofore described. Under these conditions, the lifting motor 222 has been supplied with air under pressure through a conduit 231 in accordance with operation of a control valve 232, Fig. 24, moved to operative position, by means of the timing mechanism 68, in a manner which will appear more fully hereinafter. However, when the valve 232 is moved to its other position, the supply of compressed air to the lifting motor 222 will be interrupted and the latter will be connected to a source of vacuum. Under these conditions, the piston 223 occupies the lower portion of the motor and the levers 224 and 225 will be in the lowermost positions. Hence, sleeve 192 and disc 196 secured thereto will be moved downwardly to such an extent that the crate support 195ª will be beneath the crate supporting arms 63. When this occurs, a pin 233 is received within an opening 234 of the disc 196, see Figs. 3 and 17, in order to effectively lock the disc and sleeve against possibility of rotation. Also, the lever 225 is moved downwardly a sufficient distance so that the arms 215 and 216 of the celery receiving device 149 rest upon the lateral arm 193 of the crate support 195ª, and the device 149 is also below the crate supporting arms 63. During the movement of these parts to the positions indicated, the crate 67, as viewed in Figs. 3 and 46, is permitted to engage the supporting arms 63, and, in order to facilitate this operation, suitable guiding cams 235 and 236 are mounted on the arms 63 for guiding and supporting the ends of the crate and at the same time guiding and supporting cams 237 and 238, also attached to the arms 63, serve to guide and support the sides of the crate. It will be understood that the aforementioned guiding and supporting cams are located on each of the crate supporting arms 60, 61 and 62 as well as on the arms 63 in order to support the crates as they are positioned beneath the assembling and dumping mechanism and also to support the crates as they are filled with celery and are moved from beneath the assembling and dumping mechanism by the crate shifting device 59, as will be more particularly described hereinafter.

Assuming, in Fig. 3, that the crate 67 is empty and is resting upon the crate supporting arms 63, and that the levers 224 and 225 are in their lowermost positions, the sequence of operations when the lifting motor 222 is supplied with air under pressure will now be described. As the lifting motor is charged with air pressure, lever 224 moves upwardly about the pivot 228 and, during this operation the yoke 229 moves the disc 196 and sleeve 192 upwardly, as viewed in Fig. 3. Since the crate supporting form 195ª is secured to the sleeve 192, the arms 194 and 195 of the former engage the outer bottom edges of the crate and move the latter upwardly from the supporting arms 63 to the position shown in Fig. 3. As viewed in Fig. 46, the crate 67 is formed with three bottom slats 239, 240 and 241, the same being so arranged as to leave a pair of openings on either side of the central slat 241 within which the arms 215 and 216 of the celery receiving device 149 may be projected without contacting any portion of the crate. However, as will be observed in this figure, the arms 194 and 195 of the crate support are adapted to engage the outer slats 239 and 240 of the crate. Only a portion of the latter has been illustrated in Fig. 46 but it will be understood that the same is provided with the usual ends and slat sides, the feature of the crate formation being that of the provision of the two openings in the bottom and the elimination of any bottom cross slats therein, in order to permit functioning of the celery receiving device up through the bottom of the crate during filling thereof.

After the sleeve 192 has been raised to the position illustrated in Fig. 3, further upward movement thereof being arrested by a suitable stop mechanism, not shown, which may cooperate with the disc 196 or any part movable therewith, continued upward movement of the piston 223 serves to move the lever 225 upwardly about the pivot 226. Under these conditions, the yoke 229 operates as a fulcrum for lever 224. The yoke 230 thereupon moves the sleeve 217 and celery receiving device 149 secured thereto in an upward direction and finally the parts come to rest at the positions shown in Fig. 3. At this stage of the operation, the celery receiving device is located beneath the dump plates and the relative positions of these parts are as shown in Fig. 14 where the device 149 is adapted to receive the first layer of celery stalks. It will be observed that the distance between the dump plates and the device 149 is such that the stalks, as they drop upon the device, travel a limited distance only, the construction being such that this distance is sufficient so that there is some slight clearance between the tops of the stalks, after they have been dumped, and the dump plates as they are closed to receive the next assembled layer of celery. Thus, in view of the short travel of the layer, probabilities of scarring and bruising of the celery stalks are greatly lessened and alignment of the stalks will be assured in order to properly and neatly pack the crate.

During the dumping of successive layers upon the receiving device 149, the charging of the lifting cylinder 222 with air pressure is maintained. However, it will be understood that, due to the weight of the layers of stalks as they are dumped on the device 149, the lever 225 will be moved downwardly, as viewed in Fig. 3. In this connection, it is to be pointed out that the charging pressure, size of motor 222 and leverage ratios are such that downward movement of the device 149 with each added layer of celery is assured. It is highly desirable, however, that this downward movement be checked or limited at a point so that the distance between the top layer of stalks in the crate and the dump plates will be substantially equal to that which was provided for receiving the first layer of stalks. Means are, accordingly, provided for limiting this downward movement and, as illustrated in Fig. 3, such means include a slide 242 movable longitudinally in a groove 243 in the base 69. The slide is provided with a plurality of steps 244 with which an arm 245 cooperates, the latter being pivoted as at 246 to the lever 225 and being suitably guided by a stationary arm 247 so that the arm 245, during downward movement of the lever 225, partakes of substantially rectilinear movement. A return arm 248 attached to the lever 225 moves the slide to the position shown in Fig. 3 when the lever is raised to its uppermost position, it being understood that, as the lever 225 moves downwardly under the weight of the successive layers of celery stalks, the arm 248 is moved to its dotted-line position permitting the slide 242 to move to its dotted-line position and thus bring the steps 224 successively into cooperation with the lower end of the lever 245.

It will be recalled in the previous description that, after successive layers of celery are dumped upon the device 149, the crate support 195a is rotated through 180° in order that the next succeeding layer of celery stalks will occupy a reversed position with respect to the previously dumped layer. This action is secured through energization of the reversing motor 190 and actuating member 204 secured to the piston 202 thereof. For example, after the first layer of celery stalks has been dumped upon the receiving device 149 and at a suitable time during assembly of the second layer of stalks, the motor 190 is energized and, through cooperation of the member 204 and the disc 196, Figs. 3 and 17, the sleeve 192 and parts secured thereto are moved through 180°. This action is utilized by the present invention in order to move the slide 242, it being pointed out that, as the crate support is reversed, the slide is advanced slightly so that the celery receiving device 149 and celery layer supported thereby may be moved downwardly to the limit heretofore set forth.

The aforementioned movement of the slide is effected during movement of the reversing piston 202 when the latter is charged with air pressure during a crate reversing operation. Referring to Fig. 3, the slide is actuated by a pawl 249 pivotally mounted at 250 upon an arm 251, the latter being supported by the base 69 as by means of a suitable pivot 252. The arm 251 is provided at its upper end with a pin 254 arranged to project into the path of movement of the lateral branch 255 of the member 204 so as to be engaged thereby when the member 204 is returned to its full-line position. The construction is such, however, that, when the member 204 is advanced to its dotted-line position, it freely moves away from the pin without disturbing the arm 251. In the normal position of the parts, a stop 256 maintains the pawl 249 in the position shown. When the member 204 is advanced during the crate reversing operation, the lateral portion 255 engages a cam arm 257, secured to arm 251 and projecting into the path of portion 255. When this occurs, the arm 251 is moved in a counterclockwise direction, as viewed in Fig. 3. It will be understood that, during such movement of the arm, the pawl 249 is advanced and moves downwardly under the action of gravity to engage one of a plurality of notches 258 provided on the slide 242. The construction is such that, after the cam arm has been engaged by extension 255 and moved a slight distance, corresponding substantially to the space between notches 258, the portion 255 clears the upper end of the cam arm 257 and further movement of the lever 251 in a counterclockwise direction, under the influence of the outwardly moving crate reversing piston, is arrested. Thereafter, the piston and actuating member 204 continue to move outwardly to the dotted-line position in order to complete the reversal of the crate. Thus, during a reversing operation, when the motor 190 is charged with air under pressure, the pawl 249 engages one of the notches 258 and moves the slide to the left, as viewed in Fig. 3, a distance substantially equal to the space between the notches. When this occurs, the next adjacent step 244 will be positioned beneath the lower end of the arm 245 and thus will form a check or stop for the arm, thereby forming a limit to the extent of downward movement of the device 149.

Assuming that the parts occupy the position illustrated in Fig. 3, it will be readily understood from the foregoing that, as soon as the first layer of celery stalks is dumped upon the device 149, the latter tends to move downwardly to the position shown in Fig. 15. In Fig. 3, this movement takes place and the lower end of the arm 245 will engage a step 259 of the slide. The device 149 is now in a position to receive the second layer of stalks and, during assembly of the second layer on the dump plates, it will be recalled that the crate reversing motor 190 is energized in order to reverse the crate 67, crate support 195a and receiving device 149. When this occurs, the pawl 249 engages the first of the notches 258, thus advancing the slide 242 to a position where the lower end of the arm 245 engages the right-hand extremity of the step 259. Later, during assembly of the second layer of stalks, the reversing cylinder 190 is opened to vacuum through operation of the valve 211a, as will appear more fully hereinafter, and the piston 202 is drawn back in the cylinder 201. When this occurs, and, during the last portion of the movement, the extension 255 will engage the pin 254 and return the arm 251 to its upright position. Pawl 249 will be disengaged from the first of the notches 258 and the stop 256 will elevate the same and maintained it in the position illustrated and in readiness to engage the second of the notches 258 upon a subsequent advance of the piston 202.

After dumping of the second layer of stalks, and at a suitable time during assembly of the third layer on the dump plates, as heretofore described, the reversing cylinder 190 will be charged with air under pressure and the above operation repeated. This will move the slide 242 a further distance to the left, bringing the step 260 into registry with the lower end of the arm 245, whereupon the latter will drop down, under the load of the first and second layers of stalks on the device 149, and engage the step. After the third layer of stalks is dumped and during assembly of the fourth layer, the slide 242 will be moved in response to crate reversing operation of the motor 190 so as to bring the step 261 into registry with the arm 245. The latter will promptly drop to engage the step. These operations are repeated, the fourth layer being dumped while the arm 245 engages step 261, the fifth layer being dumped when the arm engages step 262 and the sixth layer being dumped when the arm abuts the step 263. During assembly of the seventh or last layer, in the example chosen, the slide 242 is advanced its final movement to the left, as viewed in Fig. 3, thus moving step 263 to the left beyond the lower end of the rod 245. When this occurs, the celery receiving device 149 will drop down and rest upon the arm 193 of the crate support 195a but the latter will continue to be maintained in the position shown in Fig. 3 through the lever 224 and sleeve 192. It will be appreciated that, as the successive layers of celery have been dumped upon the device 149 and lever 225 has moved in a clockwise direction about pivot 226, the piston 223 has been moved downwardly in the lifting motor 222. However, the yoke 229 of lever 224 still maintains the disc 196 and sleeve 192 in the position shown in Fig. 3. With the foregoing in mind, it will be appreciated that it is unnecessary to support the arm 245 for the last or seventh layer of celery, and the arm 245, when the last layer is dumped, is maintained in a position over the step 264 but spaced upwardly therefrom.

After the seventh and last layer of stalks has been dumped, or at a suitable time thereafter, determined by the timing mechanism 68, the lifting motor 222 is connected to the vacuum supply, through operation of valve 232, and the levers 224 and 225 move downwardly their final movements in order that the crate support 195a and the receiving device 149 may drop below the crate supporting arms 63. The crate will then be guided through cams 235, 236, 237 and 238 to supporting position on the latter arms and will be in readiness for operation of the crate shifting mechanism 59. When the latter has operated to shift a new empty crate beneath the assembling and dumping mechanism and the lifting cylinder 222 is again charged with air under pressure to raise the levers 224 and 225, it will be understood that the arm 248 returns the slide 242 to the position shown in Fig. 3. A suitable stop, not shown, may be provided for engagement with the right-hand extremity of the slide 242 to govern this position, or the inner end of the slide 242 may engage the inner end of the slot 243 for this purpose.

After a crate has been filled with celery stalks, as indicated above, the crate shifting mechanism 59 functions in order to shift the filled crate to a position where it can be removed from the supporting arms for application of the crate lid and for subsequent treatment, such as precooling, prior to shipment. At the same time, an empty crate is brought into registry with the assembling and dumping mechanism on the supporting arms 62, see Fig. 1. More particularly, the crate shifting mechanism 59, Figs. 2, 4 and 21, includes a shifter motor 265 having a piston 266 therein provided with a piston rod 267 connected to an actuating member 268. The latter is guided by supports 269 and 270, secured to the base 69, in much the same manner as the member 204 is guided in supports 205 and 206, see Figs. 22 and 23. The actuating member 268 cooperates with a disc 271 which is secured to a sleeve 272 suitably supported upon a base pedestal and the sleeve, at its upper portion, has affixed thereto the crate supporting mechanism including the pairs of arms 61, 62, 63 and 64, see Figs. 1 and 2. The arrangement between the disc 271 and the actuating member 268 is such that, when the motor 265 is charged with air under pressure through conduit 273, by operation of control valve 274, Fig. 24, the disc 271 will be rotated through 90°. This is effected by providing four equally spaced pins 275, 276, 277, 278 on the disc which are adapted to cooperate with a slot 279 formed in the actuating member 268. Referring more particularly to Fig. 21, as the member 268 is advanced to the left in response to air pressure energization of the motor 265, a pawl 280, carried by member 268, will strike the pin 275 and initiate the advance of the disc 271 in a clockwise direction. During this movement, pin 278 will drop into the slot 279 and the advance of the disc 271 will be continued until the latter pin leaves the slot 279. Thereupon pins 278 and 277 will rest upon the member 268 and further advance of the disc will be arrested while permitting the member 268 to be drawn back to its initial position for a subsequent advance when the valve 274 is moved to such a position as to open the motor 265 to the vacuum source. Thus, after a crate has been filled with celery stalks, as above described, the shift motor 265 is energized to move the crate supporting structure through 90°, thus delivering the filled crate to one side of the mechanism and depositing an empty crate beneath the dump plates. Thereafter, the shift cylinder 265 is returned to its normal position for a subsequent shifting action when the second crate has been filled and requires shifting. It will be understood that any suitable means may be employed for securing the aforementioned 90° movement of the crate support, the arrangement shown being one of many which may be utilized.

In order to control the fluid pressure energization of the various power motors heretofore described, the novel valve mechanism illustrated in Figs. 24 to 29 is provided. Such valve mechanism includes a plurality of valves 94, 232, 152a, 211a, and 274 contained within a suitable housing 285 for selectively controlling the application of air under pressure or vacuum from suitable sources, not illustrated, to the various power motors. The housing is suitably attached to a portion 286 of the frame and is provided with openings for receiving valve actuating members 93, 287, 288, 289 and 290. Each of these actuating members extends into the housing, see Fig. 27, and is attached to the respective valves by means of pins 291. The source of vacuum is connected to a coupling 292 which freely communicates with a bore 293, the latter being provided with a series of slots 294 longitudinally spaced along the length of the housing, as viewed in Fig. 25, each of these slots constituting the vacuum inlet port for the respective valves. The housing is also provided with a plurality of couplings 295 to which the conduits 142, 231, 152, 211 and 273 leading to the various power motors are connected and each of the couplings communicates with an outlet port 296 arranged below the inlet ports 294, as illustrated in Figs. 25 and 27. As illustrated in the latter figure, the valve 94 is so positioned as to interconnect the inlet and outlet ports 294 and 296 through a cavity 297 provided in the valve, and it will be thus understood that vacuum is conducted from the source through bore 293 to the outlet coupling 295 by way of port 294, cavity 297 and port 296. Thus, the ejector cylinder 87 controlled by valve 94 will be supplied with vacuum and the piston therein moved to the normally inoperative position.

A cover 298 is provided for the housing 285 and, as shown in Fig. 26, includes a cavity or chamber 299 to which air under pressure from a suitable source, not shown, is conducted as by means of a coupling 300. Cover 298 is held in place by suitable screws receivable in openings 301 of the cover and 302 of the housing, and a leaf spring element 303 is employed for firmly maintaining each valve element in the positions illustrated in Figs. 24 and 27 in order to efficiently prevent any leakage of fluid pressure from the pressure chamber 299 into the vacuum bore 293 when the cover is in place. Preferably, the contacting surfaces of the valve elements and housing 285 are ground in order that an efficient seal may be maintained between the vacuum bore and air pressure supply cavity. With the construction provided, and referring to Fig. 27, upward movement of the actuating member 93 will move valve 94 upwardly to such a position as to interrupt communication between ports 294 and 296 and establish communication between the latter port and the compressed air supply chamber 299. Such upward movement of the valve is enabled by reason of the guide slots 304 provided in the housing and through which the pins 291 extend. It will be appreciated that, when the aforementioned movement has occurred, fluid pressure from the source of compressed air will be conducted to the outlet coupling 295 and through the conduit connected thereto in order to supply air under pressure to the ejector power motor. It will be recalled that the valve actuating element 93, functioning to control the movement of valve 94, is operated by disc 82, see Fig. 27. The remaining valve actuating elements 287, 288, 289 and 290 are respectively operated by levers 305, 306, 307 and 308 in a manner which will appear more fully hereinafter.

One of the features of the present invention resides in the provision of novel means for timing and governing the energization of the power motors which control the various operations of the mechanism. Such governing or timing mechanism is illustrated generally at 68 in the drawings and is more particularly shown in Figs. 5, 6, 10 and 30 to 45. Preferably, the operation of the timing mechanism is controlled solely by the energization of the ejecting motor 87, and it will be recalled that the latter is in turn controlled by operation of the sizing roller 71 and associated mechanism, Fig. 6, which functions in response to movement by a celery stalk of proper size. Hence, the passage along the conveyor 53 of a celery stalk operates the sizing roller 71 associated with the particular machine adapted to handle that particular size of celery stalk and, upon operation of the sizing mechanism and ejecting motor, the entire automatic operation of the machine and governing mechanism 68 occurs.

Assuming that the machine is adjusted to pack celery stalks of No. 6 size, as previously pointed out, and that an empty crate is positioned beneath the dump plates, it is believed that a general description of the operation of the timing mechanism 68 will be of assistance in understanding the detailed construction of this mechanism which will be set forth hereinafter.

The valve 152a, which controls the fluid pressure energization of the motor 58 operating the dump plates, is moved to such a position as to charge the motor with fluid pressure as the last stalk of each layer of celery is ejected from the belt 53 and assembled with the remaining stalks on the dump plates 56 and 57. Thus, as the last stalk of each layer is assembled with the remaining stalks of the layer, the dump plates rapidly open to dump the assembled layer and thereafter promptly close to a position ready to receive the next sized stalk of the succeeding layer. The dump cylinder 58 is opened to vacuum, in order to permit return of the piston by operation of the valve 152a as the second stalk of each layer is ejected from the belt 53. This permits the dump cylinder piston to be returned to normal position for a subsequent dumping action during ejection of the last stalk of the layer.

It will be recalled from the foregoing description that, after the first layer has been dumped, the same is reversed 180° by means of operation of the reversing motor 190 and this reversing action occurs after the dumping of the first, second, third, fourth, fifth and sixth layers. The valve 211a which controls the action of the reversing motor 190 is moved to such a position as to charge the motor with fluid pressure as the second stalk of each layer of celery is being ejected from the belt 53 after the first layer. Thus, after the first layer is dumped, and as the second stalk of the second layer is being ejected, the crate reversing cylinder 190 functions to reverse the dumped layer and this reversing action occurs after the dumping of each succeeding layer of celery, except, of course, the seventh or final layer. The valve 211a, on the other hand, is moved to such a position as to connect the reversing motor 190 with the vacuum supply, to return the piston thereof to normal position, as the last stalk of every layer except the first is ejected from the conveyor belt. It will be understood that, with such an arrangement, the reversing motor is conditioned to normal position on the last stalk of the seventh and last layer and is prepared to be charged with fluid pressure to reverse the position of the first dumped layer as the second stalk of the second layer is being ejected. The controlling action of the dump and reverse valves 152a and 211a is known as the layer control action and is to be distinguished from the crate control actions which will be referred to in the following.

As to the action of the crate controls, it will be recalled that these comprise the lifting motor 222 and the crate shifting motor 265. In order to condition the apparatus to pack the first crate, the lifting motor 222 must be charged with pressure prior to the dumping of the first assembled layer, and, when this occurs, the crate 67, Fig. 2, is lifted from the supporting arm 63 and the receiving device 149 is raised to the position shown. In order to effect this operation, the valve 232 is moved to charge the lift motor 222 as the next to the last stalk of the first layer of the crate is being ejected from the conveyor belt. Hence, the crate 67 and device 149 will be in position to receive the first layer of celery as it is dumped during ejection and assembly of the last stalk of the first layer. The valve 232, on the other hand, is moved to such position as to exhaust the lift motor 222 and connect the same with the vacuum supply as the last stalk of the last layer of celery of the crate is being ejected from the conveyor. When this action occurs, the crate 67, as viewed in Fig. 2, will be permitted to drop and engage the supporting arms 63 as heretofore described.

The action of the crate shifting motor 265, in shifting the filled crate away from the assembling mechanism and in positioning an empty crate beneath the latter, is controlled by operation of the valve 274, Fig. 24. This valve is so controlled as to be opened in order to charge the shifting motor 265 with fluid pressure, as the last stalk of the last layer of each crate is being ejected. The piston of this motor is returned to normal position as the last stalk of the first layer of each subsequent crate is being ejected, this being controlled by movement of the valve 274 to a position to supply the motor 265 with vacuum.

With the above general description in mind, reference will be had more particularly to Figs. 5, 6 and 10 wherein the timing mechanism 68 is shown in detail. As shown, the said mechanism includes ratchet and indexing discs 310 and 311 which are rotatable as a unit on a shaft 312 secured to a part 313 of the framework. A spring 314 is confined between the disc 311 and a nut 315 and serves to maintain these two discs in the position illustrated in Fig. 6. The disc 310 is provided with a plurality of teeth or notches 316 equally spaced about its periphery, eleven of such notches being provided in the present case in order to correspond to the maximum number of stalks in any one layer of the crate to be sized and packed. As shown in Figs. 5 and 10, the disc 310 is so mounted that the notches 316 may be engaged by a pin 317 carried by the arm 90, as the latter is moved in a stalk ejecting operation. It will be recalled that arm 90 is operated in response to energization of the ejecting motor 87, the valve 94 being moved to admit fluid pressure to said motor through operation of the tripping mechanism 101. The latter mechanism is controlled by the sizing device 54. The construction and arrangement of the pin 317 and disc 310 is such that the former engages one of the notches 316 and moves the disc 310 a distance of one notch at about the time the celery stalk to be sized has been moved off of the belt and is in assembled relation with respect to the prior sized stalks. Thus, as successive stalks to be sized engage and move the gate 79 in order to energize the ejecting cylinder, operation of the latter will advance the disc 310 a distance equal to the space between the teeth or notches 316. Since, in the example chosen for illustration, the maximum number of stalks of any one layer is eleven, there are eleven teeth in the disc 310 and each complete revolution of the latter is equivalent to the ejection and assembling of one layer of celery. In the example, however, only ten stalks are required in layers two to six inclusive. By a mechanism which will be hereinafter described, the cooperation of disc 310 with the arm 90 is such that the latter will engage and move the disc only ten times to effect one complete revolution of the disc when the stalks for layers two to six inclusive are being sized and assembled.

Means are provided for utilizing the movement of the indexing disc 311 and the ratchet disc 310 for controlling the operation of the bank of valves illustrated in Fig. 24. As shown, Fig. 6, such means include a driving disc or member 318 suitably rotatably mounted upon a shaft 320 carried by frame portion 313. Secured to the disc 318 by a rod 319, in order to be rotated synchronously with the movement of the disc 318, are cam discs 321, 322, 323 and 324 for respectively controlling the operation of valve operating members 287, 288, 289 and 290. Driving engagement between discs 318 and 311 is achieved by providing the latter with a slot 325 adapted to cooperate with successive pins 326 carried by the disc 318 and spaced equally about the periphery thereof. It will be noted that seven pins are employed and this number corresponds to the number of layers of celery in the crate to be sized.

It has been found desirable to drive the disc 318 and cams 321, 322, 323 and 324 during that portion of the rotation of the indexing disc 311 which corresponds to the ejection of the last stalk and the first and second stalks of each layer, the movements of the aforementioned discs being utilized at these times for operating the various control valves. Referring to Fig. 10, the parts are herein shown as adjusted to their initial position and one of the pins 326 on disc 318 is received in the slot 325. As the discs 310 and 311 are advanced a distance equal to one notch, by movement of the arm 90, the disc 318 will be moved counterclockwise, as viewed in this figure, a distance corresponding to the one notch. As the second stalk of celery is ejected and the discs 310 and 311 are advanced a second notch, the driving engagement between discs 311 and 318 will be interrupted, the pin 326 being disengaged from the slot 325, as illustrated diagrammatically in Fig. 34. As the remaining stalks of the layer are ejected, no movement of the driving disc 318 will occur. However, during ejection of the next to the last stalk of each layer, the next pin 326 will be out of engagement with respect to slot 325, see Fig. 38, and, in order to move the disc 318 during the ejection of the last stalk, a pin 327, see Figs. 6, 10 and 38, is adapted to engage one of a plurality of notches 328 spaced equidistantly about the periphery of disc 318. Due to the cooperation of this pin and one of the notches, as the last stalk of celery is ejected, the disc 318 will be rotated counterclockwise, as viewed in Fig. 38, and the pin 326 will be received in the slot 325. Thereafter, as the first and second stalks of celery are ejected, the disc 318 will be advanced as described above.

It is thus seen from the foregoing description that, in response to intermittent movement of the discs 310 and 311, the driving disc 318 and cam discs 321, 322, 323 and 324 driven thereby will be intermittently moved three steps during each revolution of the disc 318, such movement corresponding to the distance between the pins 326 on the disc 318. These three steps correspond to the ejection of the last stalk and the first and second stalks of the layers and are utilized for the purpose of operating certain of the valves illustrated in Fig. 24.

With regard to the operation of the lifting cylinder 222, it will be recalled that heretofore it was stated that this cylinder is preferably energized during ejection of the next to the last stalk of the first layer of celery. In order to secure this operation, a pin 329 is fixed to the ratchet disc 310 in such a position as to engage the upper end of lever 305, see Figs. 10 and 38, in order to move the latter lever counterclockwise about a pivotal mounting 330 and cause upward movement of the valve operating element 287 during the ejection of the next to the last stalk of celery in the first layer. Upward movement of the element 287 causes corresponding movement of the valve 232 and charging of the lifting cylinder 222 with air under pressure. Thus, while operative movements of the discs 321, 322, 323 and 324 occur during ejecting strokes corresponding to the last, first and second celery stalks, the lever 305 controlling the opening of the lifting cylinder control valve 232 is controlled by the ratchet disc 310. Movement of the control valve 232 to its vacuum opening position is controlled by the cam disc 321 in a manner which will appear more fully hereinafter.

In Figs. 30 to 33, the discs 310 and 311, together with cam members 318, 321, 322, 323 and 324, have been illustrated in diagrammatic and disassembled position and all parts occupy the position which corresponds to the setting after the last stalk of celery on the last layer of the previous crate has been ejected and dumped in order to complete the packing of the previous crate. As illustrated in Fig. 30, the valve operating member 287 controlling the operation of the valve for the lifting motor 222 has been moved downwardly to supply said motor with vacuum. This was effected as the last stalk for the last layer of the previous crate was ejected and the lift cam 321 moved to the position shown in Fig. 30. A pin 335 is carried by the cam 321 for the purpose of engaging and moving a portion 336 of the lever 305 in order to effect the aforesaid downward movement of the valve operating member 287.

The cam 322 controlling the operation of the dumping cylinder 58 through valve control member 288 is illustrated in Fig. 31 as including a plurality of raised cams 337 and a plurality of indentations or depressions 338. Also carried by this disc are a plurality of pins 339 and these are so arranged that, when the upper end of the lever 306 registers with the depressions 338, one of the pins 339 will cooperate with a portion 340 of the lever and move the latter in a clockwise direction in order to effect downward movement of the valve operating member 288. Since, during operation, all of the cam discs move counterclockwise, it will be understood that, as the last stalk of celery of the last layer of the completed crate is ejected, the disc 322 has been moved counterclockwise to the position shown and the lever 306 has been moved counterclockwise by one of the cams 337 in order to move the valve operating member 288 upwardly to its compressed air supplying position. Thus, during movement to the initial position shown, the dumping cylinder 58 has been charged with pressure and the dump plates opened and closed in order to dump the last layer of the previous crate.

For controlling the operation of the reverse valve operating member 289, the cam disc 323, Fig. 32, is provided with a plurality of cam portions 341 having depressions 342 therebetween. In the example proposed, while seven layers of celery are assembled in the crate, the reversing operation, it will be recalled, takes place on only six of these layers and hence six cam members 341 are utilized on the disc 323. In the initial position shown in Fig. 32, the upper portion of the lever 307 engages one of the depressions 342. Just prior to reaching the initial position, one of a series of pins 343 has engaged a portion 344 of the lever 307 and moved the valve operating member 289 downwardly. This would correspond to movement during ejection of the last stalk of the last layer of the finished crate and it will thus be seen that, as this last stalk is ejected, the valve 211ª controlled by member 289 is opened to the source of vacuum which is communicated to the reversing motor 190 in order to return the latter to normal position. The cams 341 and depressions 342 are so arranged in cooperation with the pins 343 that the downward movement of the valve operating member 289 and the connection of the reversing cylinder to the vacuum source occurs as the last stalk of every layer is being ejected except the first layer. For this reason, the depression 342, with which the lever 307 cooperates, as shown in Fig. 32, is of longer extent than the remaining portions 342 of the reverse controlling disc 323.

With regard to the controlling action of the shift cam 324, illustrated in Fig. 33 as being in initial position, since the shifting motor controlled thereby functions only once during the filling of an entire crate, only one cam 345 is provided thereon. Secured to the disc 324 is a pin 346 which cooperates with a portion 347 of the lever 308. This pin and the cam are so arranged that, as the disc 324 is rotated during controlling action by the indexing disc 311, the pin 346 will engage portion 347 and move the valve operating member 290 downwardly at the time the cam 345 moves past the upper portion of the lever 308. In the normal position of the parts, the cam 345 has just engaged and moved the lever 308 in a counterclockwise direction corresponding to the ejection of the last stalk of celery in the last layer of the previous crate. Thus, as the cam disc 324 is moved to normal position, the valve operating member 290 has been moved upwardly and the valve 274 controlled thereby has opened to admit air pressure to the crate shifting cylinder in order to shift the packed crate away from the assembling and dumping mechanism and to bring an empty crate into position beneath the latter.

It will be apparent from the foregoing that, as the last stalk of celery of the last layer is being ejected, the lift motor 222 is supplied with vacuum in order to permit the crate 67, Fig. 2, to be returned to the supporting bars 63 and, at the same time, the shifting motor 265 is charged with fluid pressure for the purpose of shifting the mechanism 59. In order to insure a delay of the operation of the latter motor until the crate 67 has returned to the supporting arms 63, an interlock is provided between these two mechanisms. As shown, such interlock comprises a lever 348, Figs. 2 and 4, pivoted at 349 to the base 69, the said lever having an end portion 350 cooperable with the disc 196 secured to the sleeve 192 and a portion 351 cooperable with the disc 271 of the crate shifting sleeve 272. This lever is so arranged that, as long as the sleeve 192 is in the raised position, as shown in Fig. 2, the portion 351 locks the disc 271 against rotation. For this purpose, the portion 351 of the lever 348 is adapted to be received in one of a plurality of notches 352 of the disc 271. However, when the lifting motor 222 is opened to vacuum during the ejection of the last stalk of the last layer, as heretofor described, the sleeve 192 and disc 196 will be moved downwardly, as viewed in Fig. 2, as the filled crate 67 returns to the supporting bars 63. When this latter occurs, the end portion 351 will be released from interlocking engagement in one of the notches 352 of the disc 271 through clockwise movement of lever 348 about pivot 349, and the disc 271 will be free to be rotated by the crate shifting cylinder 265 which is also charged with air under pressure during the ejection of the last stalk of the last layer. It will be understood that end portion 350 includes a pair of fingers, Fig. 2, contacting upper and lower surfaces of disc 196 and arranged so as not to interfere with the pins thereon during the crate reversing operation. In Fig. 2, the end portion 350 is shown displaced 90° counterclockwise for purposes of clarity. Other arrangements may be employed for securing such an interlocked and, if desired, the timing of the air pressure energization of the shifting cylinder may be changed so that the latter will not be charged until after the ejection of the last stalk of the last layer of the crate. For example, the cam 345, Fig. 33, may be so contoured that the upward movement of the valve operating member 290 will occur during ejection of the first or second stalk of the first layer of the next crate, and it will be understood that the provision of such an arrangement will also insure complete lowering of the crate 67, Fig. 2, to the supporting bars 63 prior to the shifting operation of the shift motor 265.

Referring to Figs. 34 to 37 inclusive, these illustrate diagrammatically the positions of the various control cams after the second stalk of the first layer has been ejected. All of the timing cams have been advanced a distance corresponding to the ejection of the first two stalks as indicated by the position of the connecting member 319 connecting cams 321, 322, 323 and 324 and the only cylinder which has been changed in its condition is the dump cylinder 58. As shown in Fig. 35, the cam 32 has been rotated to such a position that one of the depressions 338 receives the upper portion of the lever 306 and one of the pins 339 has engaged the portion 340 of the lever and moved the valve operating member 288 downwardly. Thus, as the second stalk is being ejected, the valve 152a controlled by the valve operating member 288 is opened to supply vacuum to the dump cylinder and the piston in the latter returns to its normal position.

It will be recalled that, after the second stalk of the layer is ejected, the pin 326 of the driving member 318 is moved out of engagement with the slot 325 of the indexing disc 311 and the latter and the ratchet disc 310 continue movement without operating the discs 321, 322, 323 and 324. Thus, up to the time the next to the last stalk of the layer is ejected, no change in position will occur in this last mentioned group of discs. However, during ejection of the next to the last stalk of celery in the first layer, the lifting cylinder 222 is charged with fluid pressure in order to lift the empty crate off of the supporting bars 63 and move the celery receiving device 149 to the position shown in Fig. 2. This is effected, as heretofore described, by the pin 329 carried by the ratchet disc 310 and this operation has just occurred prior to the position reached in Fig. 38. The discs 321, 322, 323 and 324, in Figs. 38 to 41, occupy the same positions as in Figs. 34 to 37 inclusive.

As the last stalk of the first layer is ejected, all of the control discs are moved through the cooperation of the pin 327 carried by the indexing disc 311 and one of the notches 328 on the driving disc 318, and all discs occupy the positions shown diagrammatically in Figs. 42 to 45. It will be observed, under these conditions, that the dump control disc 322 has moved so that the valve operating lever 306 has been cammed counterclockwise by one of the cams 337 and that the valve operating member 288 has accordingly been moved upwardly in order to charge the dump cylinder with air under pressure for dumping the assembled layer of celery. No change has taken place in the operation of the reversing cylinder. However, the shifting cylinder, controlled by cam 324, is opened to vacuum since the upper portion of the lever 308 has left the cam 345 and the pin 346 has cammed the lever 308 in a clockwise direction. This completes the various operations so far as the first layer of celery of the crate is concerned.

It will be recalled that, in the example chosen for illustration, while the first layer of celery includes eleven stalks, the next five layers include only ten stalks. Means are, accordingly, provided for securing the proper timing of the control valves such that layers two to six inclusive, which are assembled and dumped, contain only ten stalks to the layer. As shown, Figs. 6 and 10, such means include a bar 355 which is suitably guided by the frame as to be capable of substantially vertical movement, as viewed in Fig. 10, the upper end of the bar being provided with a pin 356 on which the arm 90 rests during its reciprocating movement of operation of the timing, ejecting and tripping mechanisms. Normally, as viewed in Fig. 10, this bar 355 may occupy the position shown but the same is capable of being moved upwardly through a control lever 357 pivoted to the frame at 358. This lever is provided with an extension 359 connected to the lower end of the bar 355 and also upper and lower cams 360 and 361. In the normal position shown, the outer end of the arm 90 is located in its lowermost position and the outer end thereof would engage a pin 362, Figs. 6 and 10, carried by the disc 310 during the ejection of the second stalk of the first layer. If this occurred, a single throw of the arm 90 would rotate the disc 310, through cooperation with the pin 362, a distance corresponding to the ejection of two stalks, or, in other words, advance the disc 310 two notches. This actually occurs during the ejection and assembling of the second, third, fourth, fifth and sixth layers. If, however, the bar 355 is raised, the outer end of the arm 90 will not engage the pin 362 during the ejection of the second stalk of the layer and such double advance of the disc 310 will not occur. However, the pin 317 carried by arm 90 will engage the proper tooth or notch 316 on the disc 310 and only a single tooth advance of the disc 310 will be made.

In order to thus control the operation of the bar 355 through pivotal movement of the lever 357, a pin 363 is carried by the driving disc 318, Figs. 6 and 10, and, during the ejection of the first stalk of the first layer, as the disc 318 is rotated counterclockwise, as viewed in Fig. 10, the pin 363 will engage the cam 361 and move the lever 357 clockwise about its pivot 358. This action will raise the bar 355 and the outer end of the arm 90 to such an extent that, during ejection of the second stalk of the first layer, the outer end of the arm 90 will not engage the pin 362 on the disc 310. However, as above pointed out, the pin 317 will advance the disc 310 a distance of one notch by cooperation with one of the teeth 316. Thus, the double advance of the disc 310 will not occur during ejection and assembling of the first layer of celery and eleven stalks will be ejected during a complete revolution of disc 310. However, the lever 357 must be returned to the position shown in Fig. 10 at some time during the assembling of the first layer so that the double advance will occur on the second layer, and the construction of the parts must be such that this double advance also occurs on all layers up to and including the sixth. In order, therefore, to return the lever 357 to the normal position, the ratchet disc 310 is provided with a pin 364, Figs. 6 and 10, which, during ejection of the third stalk of the first layer, strikes the cam 360 and returns the lever 357 to the normal position. It will be understood that the pin 364 may be so located as to return the lever to normal position at any time after ejection of the second stalk and during ejection of the remaining stalks of the first layer. Thereafter, throughout the ejection and assembling of all layers up to and including the sixth, no further movement of the lever 357 will occur and the movement of the arm 90, associated with the ejecting motor, will cause the double advance of the disc 310 for the purpose of obtaining ten stalks in these layers. It will be understood that, with this double advance, a complete revolution of the disc 310 occurs during ten throws of the arm 90. It will also be perceived that, since there is no timing operation during ejection of the third stalk of any layer, the double advance on these layers, corresponding to the ejection of the second and third stalks, will not interfere with the proper timing operation of the various control cams.

Since the seventh layer must contain eleven stalks in the example under consideration, means are provided for moving the lever 357 to a position so that, during assembly of the last layer, the outer end of the arm 90 will clear the pin 362. Such means comprise a pin 365 on disc 318 which, during ejection of the first stalk of the last layer of the crate, occupies the same position as pin 363 in the normal position illustrated in Fig. 10. Thus, during ejection of this stalk, the pin 365 will engage the cam 361 and raise the bar 355 and the outer end of the arm 90 in precisely the same manner as was previously described in connection with the ejection of the first stalk of the first layer. Thus, the double advance of the disc 310 will not occur during assembly of the last layer, but it will be noted that the pin 364, during ejection of the third stalk of the last layer, will engage the cam 360 and return the parts 357, 355 and 90 to the normal position.

It is believed, from the foregoing, that the operation of the mechanism and the various adjustments and proportioning of the parts to secure sizing and packing of different size stalks will be fully understood.

There has thus been provided by the present invention a novel mechanism for automatically sizing and packing elongated units of various sizes and which is particularly adapted and suited for celery. In use, it will be appreciated that the first machine encountered by the celery stalks, during operation of the conveyor, will be adjusted to size and pack the largest size. The next machine is adjusted to take care of the next largest size, and so on down the conveyor. All stalks of insufficient size to operate the sizing member 71 of the first machine will pass beneath the said member and the raised gate 79 and will be conducted to the second machine where the sizing member is adjusted closer to the belt 53. Stalks of sufficient size to contact and move the sizing member of the second machine will be ejected and packed, as heretofore described, while the smaller stalks will proceed to the third machine. Here again, the proper sized stalks for which the third machine is adjusted will be ejected and packed, and so on down the conveyor.

In the foregoing description, the invention has been described as embodying arrangements for automatically sizing and packing units of a certain selected size from a plurality of units of different sizes. It is contemplated that the invention will possess a high degree of utility when used to effect these combined functions. However, it will be understood that the invention may be used for packing units of substantially the same size when only such size units are conveyed thereto. In such use, units such as celery stalks may be fed to the conveyor and the sizing roller of the machine will be adjusted to be contacted and moved by the stalks. Thus, the machine will operate as heretofore described to eject, assemble and pack the stalks which move the sizing member, and, since the latter will be moved by all the stalks, all of the latter will be packed.

It has been found in practice that the use of double-acting fluid motors, moved in one direction by air under pressure and in the opposite direction by reduced pressure from a suitable vacuum supply, secures the required positive action for the controlled devices. However, the invention contemplates the use of hydraulic motors and other power operated devices as well as spring returned double-acting actuators.

While one form of the invention has been illustrated and described herein with considerable particularity, it will be understood by those skilled in the art that various changes may be resorted to without departing from the spirit of the invention. Reference will, therefore, be had to the appended claims for a definition of the limits of the invention.

What is claimed is:

1. A machine for automatically sizing and packing celery stalks of substantially the same size into a container comprising a traveling conveyor on which stalks of various sizes are placed in spaced relation, means responsive to contact operation by stalks of substantially the same size for ejecting the latter stalks from the conveyor and for assembling them in layers at one side thereof, means for dumping the layers after assembly to allow them to drop into a container, means for supporting said container, means to reverse the container end for end after each layer of stalks has been dropped therein, and means to automatically shift a container out of cooperation with said dumping means when it is filled with a predetermined number of layers of stalks and to shift an empty container into cooperation with said dumping means.

2. A machine for automatically sizing and packing celery stalks of substantially the same size into a container comprising means for conveying stalks of various sizes along a path of travel in spaced relation, means actuated by stalks of a selected size for ejecting the latter stalks from the conveyor and for assembling them in layers at one side thereof, means for placing each layer after assembly thereof into a container, means for supporting said container, power means to reverse the supported container after each layer has been placed therein, and means to automatically shift the container out of cooperation with said placing means when it is filled with a predetermined number of layers of stalks and to shift an empty container into cooperation with said placing means.

3. A machine for automatically sizing and packing celery stalks of substantially the same size into a container comprising a conveyor for conveying stalks of various sizes along a path of travel, means for removing stalks of a selected size from the conveyor, means for assembling the selected stalks side by side as a group, power operated means for successively placing groups of assembled stalks into a container one on top of the other, means for reversing the container after each group of stalks has been placed therein, and timing means controlled by said removing means to govern the number of stalks so placed during successive operations of said power operated means.

4. A machine for automatically sizing and packing celery stalks of substantially the same size into a container comprising a traveling conveyor on which stalks of various sizes are placed in spaced relation, means for selecting, ejecting and assembling stalks of a predetermined size at one side of the conveyor, means controlled by the ejecting means for successively dumping predetermined numbers of assembled stalks into a container, means for supporting said container, power means to reverse the supported container and assembled stalks therein after operation of said dumping means, and power means controlled by the ejecting means for moving a filled container out of cooperation and for moving an empty container into cooperation with said dumping means.

5. A machine for automatically sizing and packing celery stalks of substantially the same size into a container comprising means for conveying stalks of various sizes along a path of travel in spaced relation, a sizing member overlying said conveyor and arranged to be contacted and moved by stalks of substantially the same size, means controlled by said sizing member for ejecting the latter stalks from the conveyor and for assembling the same in layers, power operated means for dumping each layer of assembled stalks into a container, means for supporting said container, means to reverse the supported container and dumped layer or layers end for end, means to automatically shift a container out of cooperation with said dumping means when it is filled with a predetermined number of layers of stalks and to shift an empty container into cooperation with said dumping means, and means controlled by said ejecting means for predetermining the number of assembled stalks in each layer prior to operation of said dumping means.

6. A machine for automatically sizing and packing celery stalks of substantially the same size into a container comprising a traveling conveyor on which stalks of various sizes are placed in spaced relation, a movably mounted sizing member arranged above the conveyor for operation by stalks of a selected size, means including a plurality of spaced apart elements for ejecting the selected stalks from the conveyor and for assembling the latter in layers, power operated means for dumping each layer of assembled stalks into a container, means for supporting said container, power means to reverse the supported container and layer or layers of assembled stalks therein after operation of the dumping means, power means controlled by the ejecting means for moving the filled container out of cooperation and for moving an empty container into cooperation with said dumping means, and timing means controlled by said ejecting means to govern the number of stalks in the dumped layers and to also govern the number of layers in a filled container.

7. A machine for automatically sizing and packing celery stalks of substantially the same size into a container comprising means for conveying stalks of various sizes thereto, means for removing and assembling stalks of a selected size at one side of the conveyor into a plurality of layers, power means for placing each layer upon completion of the assembly of a predetermined number of stalks therein into a container, means to reverse the container end for end after each layer has been placed therein, and means responsive to operation of said removing means to govern the operation of said placing means.

8. A machine for automatically sizing and packing celery stalks of substantially the same size into a container comprising means for conveying stalks of various sizes thereto, means controlled by stalks of substantially the same size for removing and assembling such stalks at one side of the conveyor into a plurality of layers, power means controlled by the removing means for releasing each layer of stalks after formation into a container, means for supporting said container, means for reversing the supporting container end for end after each layer has been released, and power means controlled by the removing means for moving a filled container out of cooperation and for moving an empty container into cooperation with said releasing means.

9. A machine for automatically sizing and packing celery stalks of substantially the same size into a container comprising a traveling conveyor on which stalks of various sizes are placed in spaced relation, power operated means actuated by stalks of substantially the same size for ejecting and assembling said stalks at one side of the conveyor into a plurality of layers each having a predetermined number of stalks therein, power means for dumping each layer upon completion of the assembly thereof into a container, means for supporting said container, power means to reverse the supported container and layer or layers therein end for end after the dumping of each layer, power operated means to automatically shift a container out of cooperation with said dumping means when it is filled with a predetermined number of layers of stalks and to shift an empty container into cooperation with said dumping means, and timing means controlled by said ejecting means to govern the operation of the dumping means, the reverse means and the shift means.

10. The method of packing celery stalks of substantially the same size from a number of stalks of various sizes which comprises selecting stalks of a predetermined size, assembling a predetermined number of the selected stalks into a first layer with the butt ends of the stalks along one edge of the layer, placing the layer of stalks into a container, reversing the container end for end, assembling a plurality of layers of stalks of the predetermined size, the number of stalks in each layer being the same but being one less than the number of stalks assembled in the first layer, placing each layer after assembly into the container, reversing the container end for end after reception of each subsequently placed layer, assembling a layer of the selected stalks into a layer having the same number as the first layer, and finally placing the last layer into the container to complete the packing thereof.

11. The method of packing celery stalks of substantially the same size from a number of stalks of various sizes which comprises selecting stalks of a predetermined size, assembling predetermined numbers of the selected stalks into a predetermined number of layers, the stalks of all layers having the butt ends facing in the same direction, releasing each layer after completion thereof into a container, and reversing the container end for end after the release of each layer up to the release of the final layer whereby the butt ends of the stalks in adjacent layers in the container will face in opposite directions.

12. The method of packing celery stalks of substantially the same size from a number of stalks of various sizes which comprises selecting stalks of a predetermined size, assembling the selected stalks into a predetermined number of layers, the butt ends of the stalks of all layers facing in the same direction, varying the number of stalks in certain of the assembled layers, releasing each layer after formation into a container, and reversing the container and layer or layers of stalks therein end for end up to the release of the last layer necessary to fill the container.

13. A machine for automatically sizing and packing celery stalks of substantially the same size into a container comprising a traveling conveyor on which stalks of various sizes are placed in spaced relation, an ejector station having power operated means for ejecting stalks of the same size laterally of the conveyor, a control member positioned at the ejector station and arranged above the conveyor and normally raised to a position to be out of contact with the stalks, means positioned in advance of said ejector station and engageable by stalks of the same size to move said member toward the conveyor to contact the said stalks as they travel with the conveyor, and means responsive to contact operation of the control member by the said stalks for energizing said power means to successively eject the stalks.

14. In a sizing and packing mechanism of the class described, a conveyor, means for feeding units to said conveyor in spaced relation, a plurality of sizing members overlying said conveyor and adapted to be respectively engaged and moved by units of different sizes, an ejector station having ejecting means for each member, a movable control member for energizing each of said ejecting means, means responsive to movement of the respective sizing members by a sized unit for moving the associated control member into the path of travel of the sized unit, and power means responsive to contact operation and movement of the control members for respectively energizing said ejecting means to eject the sized unit from the conveyor.

15. In a sizing and packing mechanism of the class described, a conveyor, means for feeding units to said conveyor in spaced relation, a plurality of sizing members overlying said conveyor and adapted to be respectively engaged and moved by units of different sizes, ejecting means associated with each member, a control sizing member for each of said ejecting means, said control member being normally positioned above the conveyor and normally arranged to be out of contact with the units, means responsive to movement of the respective sizing members by a sized unit for moving the associated control member into the path of travel of the sized unit, and power means responsive to contact operation and movement of the control members for respectively energizing said ejecting means to eject the sized unit from the conveyor.

16. In a sizing and packing mechanism of the class described, a conveyor on which a plurality of units are placed in spaced relation, a plurality of sizing members overlying said conveyor and adapted to be respectively engaged and moved by units of different sizes, ejector mechanism respectively associated with said members and including a plurality of separate elements mounted upon an endless track, a double-acting motor associated with each ejector mechanism for engaging and moving successive of said elements in one direction transversely of the conveyor to eject units therefrom, means operable by movement of any of said sizing members to energize the respective motor in one direction to effect ejecting action thereof, and means controlled by said motor to reverse the operation thereof to return it to normal position.

17. Mechanism of the class described comprising a traveling conveyor on which units of various sizes are placed in spaced relation, means associated with the conveyor for selecting units of the same size, means controlled by the selecting means to remove units of the same size from the conveyor and for assembling the removed units into layers, means for conducting each layer after assembly into a container, means to automatically shift the container when filled out of cooperation with the conducting means and to simultaneously shift an empty container into cooperation with the conducting means, and means for predetermining the number of units assembled in each layer prior to operation of the conducting means.

18. Mechanism of the class described copmrising a traveling conveyor on which units of various sizes are placed in spaced relation, means associated with the conveyor for selecting units of the same size, means controlled by the selecting means to remove units of the same size from the conveyor and for assembling the removed units into layers, power means for releasing each layer after assembly into a container, means to automatically shift the container when filled out of cooperation with the releasing means and to simultaneously shift an empty container into cooperation with the releasing means, and means controlled by the removing means for predetermining the number of units assembled in each layer prior to energization of the releasing means.

19. Mechanism of the class described comprising a traveling conveyor on which units of various sizes are placed in spaced relation, means associated with the conveyor for selecting units of the same size, means controlled by the selecting means to remove units of the same size from the conveyor and for assembling the removed units into layers, power means for releasing each layer after assembly into a container, means to automatically shift the container when filled out of cooperation with the releasing means and to simultaneously shift an empty container into cooperation with the releasing means, and means controlled by the removing means for predetermining the operation of the shifting means.

20. Mechanism of the class described comprising a traveling conveyor on which units of various sizes are placed in spaced relation, means associated with the conveyor for selecting units of the same size, means controlled by the selecting means to remove units of the same size from the conveyor, means for assembling the removed units into layers, power means for releasing each layer after assembly into a container, means to automatically shift the container when filled out of cooperation with the releasing means and to simultaneously shift an empty container into cooperation with the releasing means, and means controlled by the removing means for predetermining the number of units assembled in each layer and to energize the shifting means after a predetermined number of layers have been released.

21. Mechanism of the class described comprising a traveling conveyor on which units of various sizes are placed in spaced relation, means associated with the conveyor for selecting units of the same size, means controlled by the selecting means to eject units of the same size from the conveyor, means to pack the ejected units into a container, power means to shift the container when filled out of cooperation with the packing means, and means controlled by the ejecting means to energize the power means after a predetermined number of units have been packed in the container.

22. In a machine for automatically packing celery stalks into containers, means for assembling the stalks into layers, means for releasing the layers as they are formed, means to support a container beneath the releasing means, said container being provided with a pair of slots in the bottom thereof coextensive with the length of the container, a pair of layer receiving members projectible upwardly through said slots to a position adjacent the releasing means, and means to allow limited downward movement of said members after each layer of celery is received thereon by successive operations of the releasing means.

23. In a machine for automatically packing celery stalks into containers, means for assembling the stalks into layers, means for releasing the layers as they are formed, means to support a container beneath the releasing means, said container being provided with a pair of slots in the bottom thereof coextensive with the length of the container, a pair of layer receiving members, means for moving said members upwardly through said slots to a position adjacent the releasing means, means for checking the downward movement of said members after the release of each layer to limit the distance of drop of each layer, and means for withdrawing the members from the container after a predetermined number of layers have been released.

24. In a machine for automatically packing celery stalks into containers, means for assembling the stalks into layers, means for releasing the layers as they are formed, means to support a container beneath the releasing means, said container being provided with a bottom opening, a layer receiving device, means for moving said device upwardly through said opening adjacent said releasing means to receive the first released layer and movable downwardly in steps under the weight of additional released layers, and means to positively withdraw the device from the container when a predetermined number of layers have been released.

25. In a machine for automatically packing celery stalks into containers, means for assembling the stalks into layers, means for releasing the layers as they are formed, means to support a container beneath the releasing means, means within the container and positioned adjacent the releasing means for receiving the first released layer and movable downwardly in steps in response to the added weight of each succeeding released layer, and means operated by said releasing means for positively depressing each released layer to maintain the stalks in alignment during the releasing of the layers.

26. In a machine for automatically packing celery stalks into containers, means for assembling the stalks into layers, means for releasing the layers as they are formed, means to support a container beneath the releasing means, means for raising the container off the support means prior to the release of the first layer, yieldable means within the container for receiving the released layers, means for withdrawing the yieldable means from the container after a predetermined number of layers have been released, means to return the container to the support means, and means to automatically shift the support and filled container.

27. The method of sizing celery stalks and packing the sized stalks into a container which comprises selecting stalks of a desired size from a plurality of stalks of various sizes, assembling the selected stalks side by side in a plurality of separate layers, releasing each layer after assembly into the container, shifting the container when filled, and predetermining the number of stalks in each layer and the number of layers released prior to the shifting step in accordance with the selecting step.

28. The method of packing celery stalks of substantially the same size from a number of stalks of various sizes which comprises selecting stalks of a predetermined size, assembling the selected stalks side by side into a predetermined number of layers one after the other, the butt ends of the stalks of all layers facing in the same direction, varying the number of stalks in certain of the layers during assembly thereof, and placing each complete layer after formation into the container in reversed relation with respect to the preceding layer.

29. In a sizing mechanism of the class described, a traveling conveyor on which a plurality of stalks of celery of different sizes are placed, a plurality of ejecting stations spaced apart along the length of the conveyor at each of which celery stalks of a predetermined size are adapted to be removed from the conveyor, and means for selecting stalks of the same size from said plurality of stalks and for removing the selected stalks from the conveyor at the corresponding ejecting station comprising movable sizing means positioned for engagement and movement by the stalks in advance of the respective ejecting stations, sizing control means operatively connected with the sizing means and movable to a predetermined preset position in accordance with the movement of the sizing means, means operable when the stalks reach the particular ejecting station for which they have been sized for moving said sizing control means out of said preset position, and means operable in accordance with said last named movement to remove the stalks from the conveyor.

JACK CHRISTIAN.

REFERENCES CITED

The following references are of record in the file of this patent:

UNITED STATES PATENTS

| Number | Name | Date |
|---|---|---|
| 1,045,391 | Graf | Nov. 26, 1912 |
| 1,090,855 | Jagenberg | Mar. 24, 1914 |
| 1,208,802 | Lienau et al. | Dec. 19, 1916 |
| 1,345,926 | Harris | July 6, 1920 |
| 1,434,587 | Broadley | Nov. 7, 1922 |
| 1,596,914 | Winkley | Aug. 24, 1926 |
| 1,668,665 | White | May 8, 1928 |
| 1,745,381 | Ray | Feb. 4, 1930 |
| 1,798,608 | Kasser | Mar. 31, 1931 |
| 1,872,903 | Cutter | Aug. 23, 1932 |
| 1,896,639 | Meyer et al. | Feb. 7, 1933 |
| 2,061,490 | Thompson et al. | Nov. 17, 1936 |
| 2,231,435 | Christian | Feb. 11, 1941 |
| 2,296,802 | Thompson | Sept. 22, 1942 |
| 2,400,484 | Campana | May 21, 1946 |
| 2,417,753 | Hesson | Mar. 18, 1947 |
| 2,430,878 | Kimball | Nov. 18, 1947 |